United States Patent
Seo et al.

(10) Patent No.: US 12,069,358 B2
(45) Date of Patent: Aug. 20, 2024

(54) CAMERA MODULE AND ELECTRONIC DEVICE INCLUDING CAMERA MODULE WITH LENS ASSEMBLY

(71) Applicant: Samsung Electronics Co., Ltd., Gyeonggi-do (KR)

(72) Inventors: Jinseon Seo, Gyeonggi-do (KR); Jungpa Seo, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 121 days.

(21) Appl. No.: 17/744,849

(22) Filed: May 16, 2022

(65) Prior Publication Data

US 2022/0394160 A1 Dec. 8, 2022

Related U.S. Application Data

(63) Continuation of application No. PCT/KR2022/001783, filed on Feb. 2, 2022.

(30) Foreign Application Priority Data

Jun. 7, 2021 (KR) ........................ 10-2021-0073323

(51) Int. Cl.
*H04N 23/55* (2023.01)
*G02B 3/04* (2006.01)
(Continued)

(52) U.S. Cl.
CPC ............. *H04N 23/55* (2023.01); *G02B 3/04* (2013.01); *G02B 9/64* (2013.01); *G02B 13/0045* (2013.01); *H04N 23/51* (2023.01)

(58) Field of Classification Search
None
See application file for complete search history.

(56) References Cited

U.S. PATENT DOCUMENTS 11,340,424 B2 * 5/2022 Son .................... G02B 7/021
11,785,324 B1 * 10/2023 Seo .................... G02B 13/0045
348/335
(Continued)

FOREIGN PATENT DOCUMENTS

CN 211318862 U 8/2020
CN 211698383 U * 10/2020 ............. G02B 13/00
(Continued)

OTHER PUBLICATIONS

Cai et al.; CN-211698383-U; Optical Imaging System And Image Capturing Device And Electronic Device Having The Same; Oct. 16, 2020; pp. 1-12; English Translation (Year: 2020).*

(Continued)

*Primary Examiner* — Cynthia Segura
(74) *Attorney, Agent, or Firm* — Cha & Reiter, LLC

(57) ABSTRACT

According to various embodiments of the disclosure, a camera module may comprise a first lens, a second lens, a third lens, a fourth lens, a fifth lens, a sixth lens, a seventh lens, and an eighth lens arranged in order from a subject. The first lens may have positive (+) refractive power and include a 1-1th surface convex toward the subject. The seventh lens may include a 7-1th surface facing the subject and including at least one inflection point. The eighth lens may have negative (−) refractive power, include an 8-1th surface facing the subject and formed as an aspherical surface, and include an 8-2th surface opposite to the 8-1th surface, the 8-2th surface including at least one inflection point and is formed as an aspherical surface. Other various embodiments are also possible.

20 Claims, 17 Drawing Sheets

(51) Int. Cl.
  *G02B 9/64*  (2006.01)
  *G02B 13/00* (2006.01)
  *H04N 23/51* (2023.01)

(56) References Cited

U.S. PATENT DOCUMENTS

| | | | |
|---|---|---|---|
| 2017/0045714 A1 | 2/2017 | Huang | |
| 2017/0269339 A1 | 9/2017 | Jung et al. | |
| 2018/0239117 A1* | 8/2018 | Lee | G02B 27/0025 |
| 2019/0056568 A1* | 2/2019 | Huang | G02B 9/64 |
| 2019/0361203 A1 | 11/2019 | Jhang et al. | |
| 2020/0012078 A1 | 1/2020 | Kuo | |
| 2020/0026042 A1* | 1/2020 | Teraoka | G02B 9/64 |
| 2020/0241250 A1 | 7/2020 | Kim | |
| 2020/0249439 A1 | 8/2020 | Song et al. | |
| 2020/0355891 A1 | 11/2020 | Ye et al. | |
| 2020/0363610 A1 | 11/2020 | Ko et al. | |
| 2021/0149158 A1* | 5/2021 | Hsueh | G02B 9/64 |
| 2021/0157104 A1 | 5/2021 | Jung et al. | |
| 2021/0302699 A1* | 9/2021 | Jhang | G02B 3/04 |
| 2022/0196978 A1* | 6/2022 | Jhang | G02B 27/0025 |
| 2022/0214521 A1* | 7/2022 | Yang | G02B 9/64 |
| 2022/0236534 A1* | 7/2022 | Liu | G02B 15/1461 |
| 2022/0413266 A1* | 12/2022 | Arita | G02B 13/06 |
| 2023/0068298 A1* | 3/2023 | Seo | G02B 13/16 |
| 2023/0204907 A1* | 6/2023 | Seo | H04N 25/61 348/241 |
| 2023/0324654 A1* | 10/2023 | Lin | G02B 9/62 359/713 |

FOREIGN PATENT DOCUMENTS

| | | |
|---|---|---|
| CN | 211698383 U | 10/2020 |
| JP | 2020-13082 A | 1/2020 |
| KR | 10-2017-0109469 A | 9/2017 |
| KR | 10-2018-0095276 A | 8/2018 |
| KR | 10-2020-0001452 A | 1/2020 |
| KR | 10-2020-0092584 A | 8/2020 |
| KR | 10-2020-0131010 A | 11/2020 |
| KR | 10-2021-0063888 A | 6/2021 |

OTHER PUBLICATIONS

International Search Report dated May 4, 2022.

* cited by examiner

CAMERA MODULE AND ELECTRONIC DEVICE INCLUDING CAMERA MODULE WITH LENS ASSEMBLY

CROSS-REFERENCE TO RELATED APPLICATION(S)

This application is based on and claims priority under 35 U.S.C. § 120 to PCT International Application No. PCT/KR2022/001783, which was filed on Feb. 4, 2022, and claims priority to Korean Patent Application No. 10-2021-0073323, filed on Jun. 7, 2021, in the Korean Intellectual Property Office, the disclosure of which are incorporated by reference herein their entirety.

BACKGROUND

Technical Field

One or more embodiments of the instant disclosure generally relate to a camera module and an electronic device including the camera module.

Description of Related Art

With the development of information and communication technology and semiconductor technology, various functions are being integrated into one portable electronic device. For example, an electronic device may implement not only communication functions but also entertainment functions, such as playing games, multimedia functions, for example image capture, playing music and videos, communication and security functions for mobile banking, and scheduling and e-wallet functions. Such electronic devices have become compact enough for users to conveniently carry them.

Optical devices, e.g., cameras capable of capturing images or videos have been widely used. Recently, digital cameras or video cameras using a solid-state image sensor, such as a charge coupled device (CCD) type image sensor or complementary metal-oxide semiconductor (CMOS) type image sensor, have been used. Solid image sensor (CCD or CMOS)-adopted optical devices may be suitable for miniaturization and may easily save, copy, or transmit images as compared with film-type optical devices.

To obtain high-quality images and/or videos, a plurality of lenses may be put to use. A lens assembly, for example a combination of multiple lenses, has lower F-number and smaller aberration and thus enables obtaining higher-quality (higher-resolution) images and/or videos. Multiple lenses may be required to achieve low F-number and low aberrations. Optical devices have typically been configured for devices specialized for image capturing, such as digital cameras, but are being equipped in compact electronic devices such as mobile communication terminals.

SUMMARY

Electronic devices with communication functionality, such as portable terminals, are being reduced in size and weight to maximize user portability and convenience and, for high performance, integrated components are packed into a small space. To mount an optical device (e.g., camera module) in a compact electronic device, the number of lenses included in the camera module may be limited. However, limiting the number of lenses included in the camera module to reduce the size of the camera module may render it difficult to obtain high-quality image and/or video. For example, the camera module including a limited number of lenses may have insufficiently low F-number and low aberration.

According to an embodiment of the disclosure, a camera module may comprise a first lens, a second lens, a third lens, a fourth lens, a fifth lens, a sixth lens, a seventh lens, and an eighth lens arranged in order from a subject. The first lens may have positive (+) refractive power and include a 1-1th surface convex toward the subject. The seventh lens may include a 7-1th surface facing the subject and including at least one inflection point. The eighth lens may have negative (−) refractive power, include an 8-1th surface facing the subject and formed as an aspherical surface, and include an 8-2th surface opposite to the 8-1th surface, the 8-2th surface including at least one inflection point and is formed as an aspherical surface. The camera module may be configured to meet conditional equation 1, conditional equation 2, and conditional equation 3 below.

$$1 < \frac{f}{f1} < 2 \quad \text{[Conditional equation 1]}$$

(f denotes a composite focal length of the camera module, and f1 denotes a focal length of the first lens).

$$0.4 < \frac{TTL}{IH*2} < 0.62 \quad \text{[Conditional equation 2]}$$

(TTL denotes a distance from an outermost surface of the camera module to an image plane, and IH denotes an image height at an effective diameter). [Conditional equation 3] 50<L8 Vd<70 (L8 Vd denotes an Abbe number of the eighth lens).

According to an embodiment of the disclosure, an electronic device may comprise a housing and a camera module at least partially disposed in the housing. The camera module may comprise a first lens, a second lens, a third lens, a fourth lens, a fifth lens, a sixth lens, a seventh lens, and an eighth lens arranged in order from a subject. The first lens may have positive (+) refractive power and include a 1-1th surface convex toward the subject. The seventh lens may include a 7-1th surface facing the subject and including at least one inflection point. The eighth lens may have negative (−) refractive power, include an 8-1th surface facing the subject and formed as an aspherical surface, and include an 8-2th surface opposite to the 8-1th surface, the 8-2th surface including at least one inflection point and is formed as an aspherical surface. The camera module may be configured to meet conditional equation 1, conditional equation 2, and conditional equation 3 below.

$$1 < \frac{f}{f1} < 2 \quad \text{[Conditional equation 1]]}$$

(f denotes a composite focal length of the camera module, and f1 denotes a focal length of the first lens).

$$0.4 < \frac{TTL}{IH*2} < 0.62 \quad \text{[Conditional equation 2]}$$

(TTL denotes a distance from an outermost surface of the camera module to an image plane, and IH denotes an image height at an effective diameter). [Conditional equation 3] $50 < L8\,Vd < 70$ (L8 Vd denotes an Abbe number of the eighth lens).

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

According to certain embodiments of the disclosure, a camera module is reduced in size by reshaping at least some of the lenses and may thus be equipped in a miniaturized electronic device. It is also possible to obtain high-resolution and bright images.

According to certain embodiments of the disclosure, it is possible to provide a camera module that may be disposed in a miniaturized electronic device.

According to certain embodiments of the disclosure, it is possible to provide a camera module for enhancing optical characteristics (e.g., aberration characteristics, wide-angle characteristics, and/or brightness characteristics).

The disclosure is not limited to the foregoing embodiments but various modifications or changes may rather be made thereto without departing from the spirit and scope of the disclosure.

Figure 1:
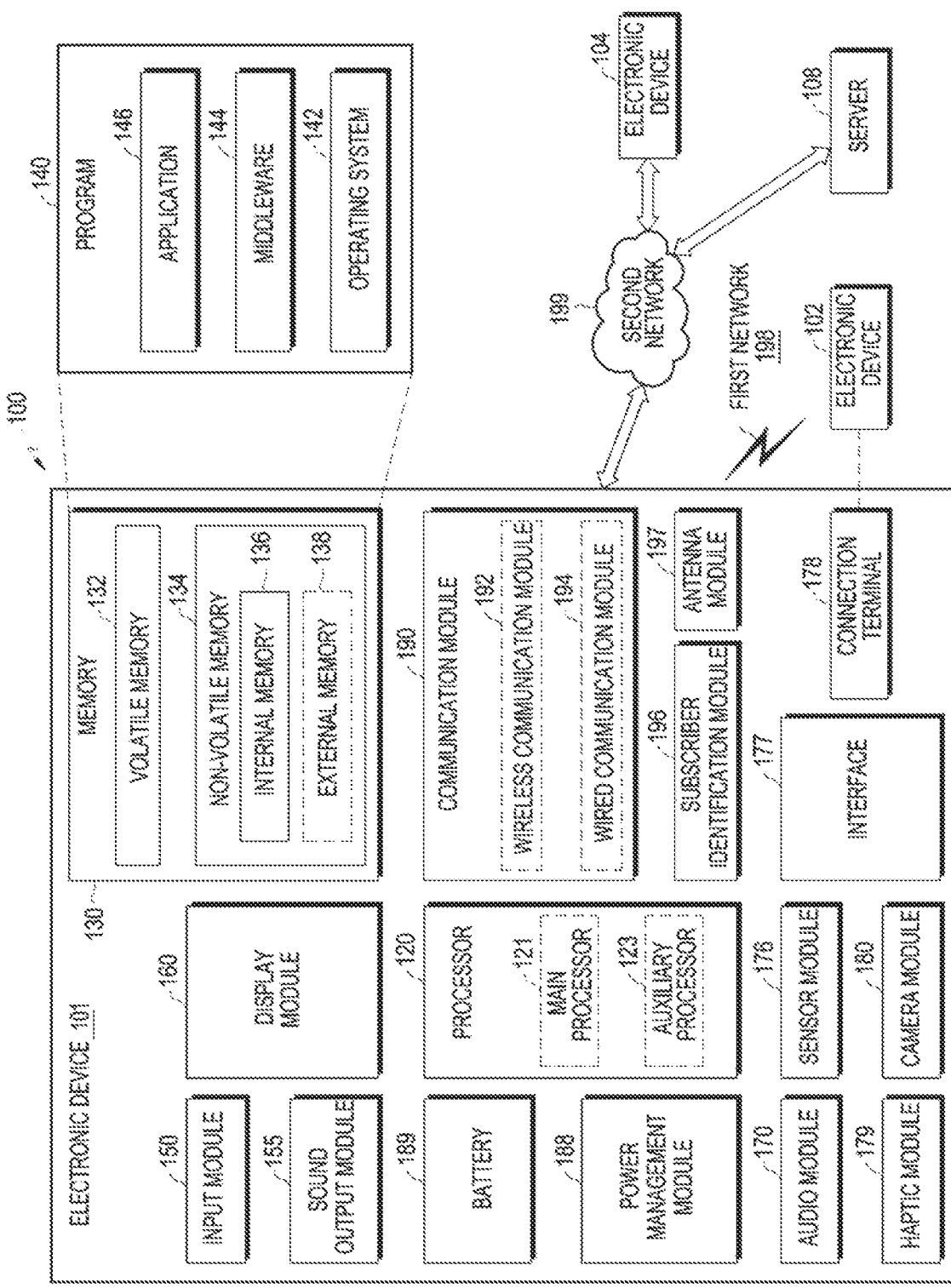
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
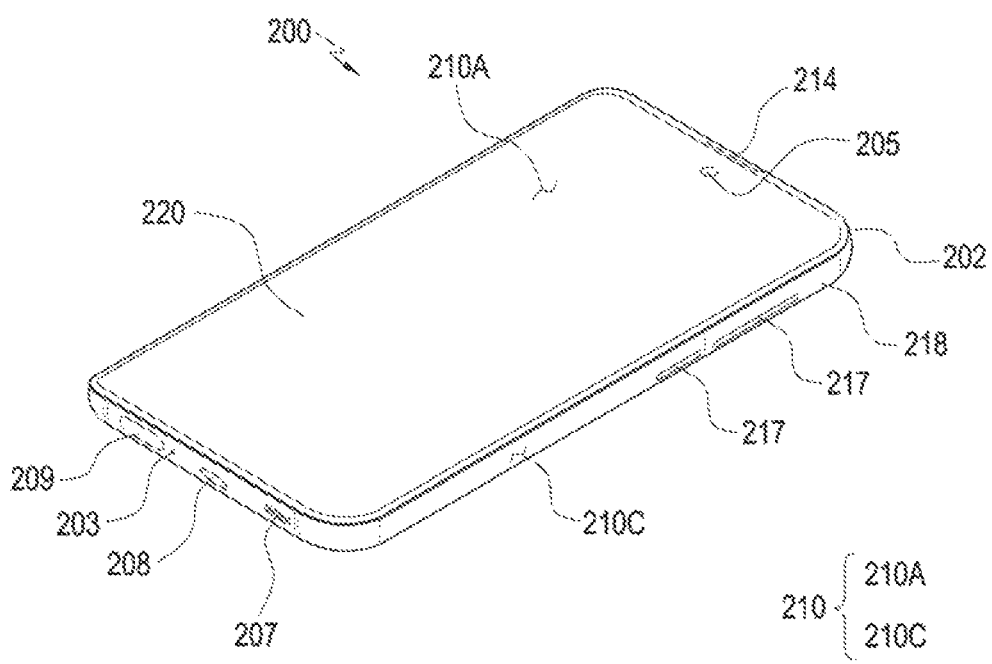
FIG. 2 is a front perspective view illustrating an electronic device according to an embodiment of the disclosure.
Figure 3:
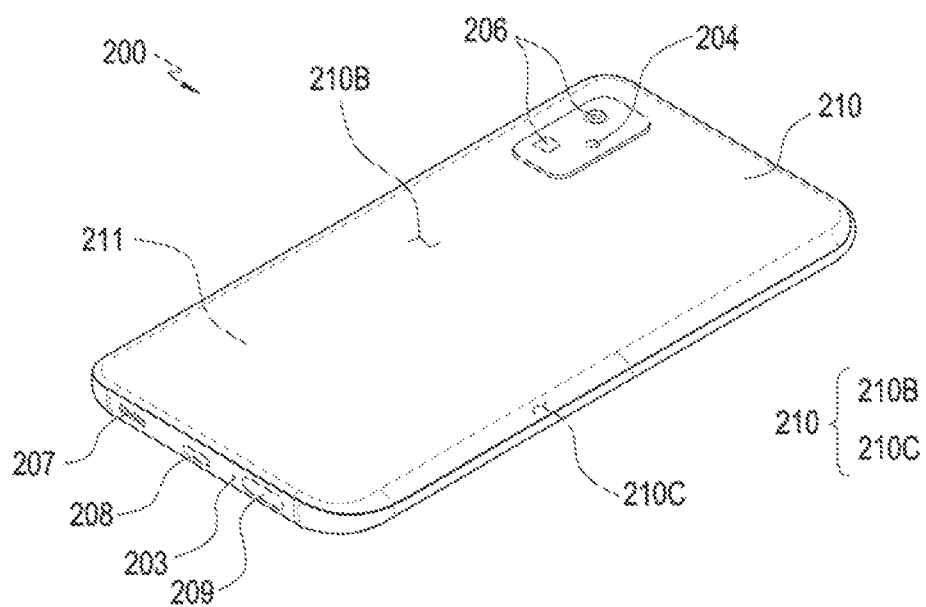
FIG. 3 is a rear perspective view illustrating an electronic device according to an embodiment of the disclosure.

FIG. 2 is a front perspective view illustrating an electronic device according to an embodiment of the disclosure; FIG. 3 is a rear perspective view illustrating an electronic device according to an embodiment of the disclosure;

Referring to FIGS. 2 and 3, according to an embodiment, an electronic device 200 may include a housing 210 with a front surface 210A, a rear surface 210B, and a side surface 210C surrounding a space between the front surface 210A and the rear surface 210B. According to another embodiment (not shown), the housing 210 may refer to a structure forming part of the front surface 210A, the rear surface 210B, and the side surface 210C of FIG. 2. According to an embodiment, at least part of the front surface 210A may have a substantially transparent front plate 202 (e.g., glass plate or polymer plate including various coat layers). The rear surface 210B may be formed by a rear plate 211. The rear plate 211 may be formed of, e.g., glass, ceramic, polymer, metal (e.g., aluminum, stainless steel (STS), or magnesium), or a combination of at least two thereof. The side surface 210C may be formed by a side bezel structure (or a "side surface member") 218 that couples to the front plate 202 and the rear plate 211 and includes metal and/or polymer. According to an embodiment, the rear plate 211 and the side bezel plate 218 may be integrally formed together and include the same material (e.g., glass, metal, such as aluminum, or ceramic). According to another embodiment, the front surface 210A and/or the front plate 202 may be referred to as part of the display 220.

According to an embodiment, the electronic device 200 may include at least one of a display 220, audio modules 203, 207, and 214 (e.g., the audio module 170 of FIG. 1), a sensor module (e.g., the sensor module of FIG. 1). 176), camera modules 205 and 206 (e.g., the camera module 180 of FIG. 1), a key input device 217 (e.g., the input module 150 of FIG. 1), and connector holes 208 and 209 (e.g., the connection terminal 178 of FIG. 1). According to an embodiment, the electronic device 200 may exclude at least one (e.g., the connector hole 209) of the components or may add other components. According to an embodiment, the display 220 may be visually exposed through, e.g., most of the front plate 202.

According to an embodiment, the surface (or the front plate 202) of the housing 210 may include a screen display area formed by the display 220 being visually exposed. For example, the screen display area may include the front surface 210A.

Figure 6:
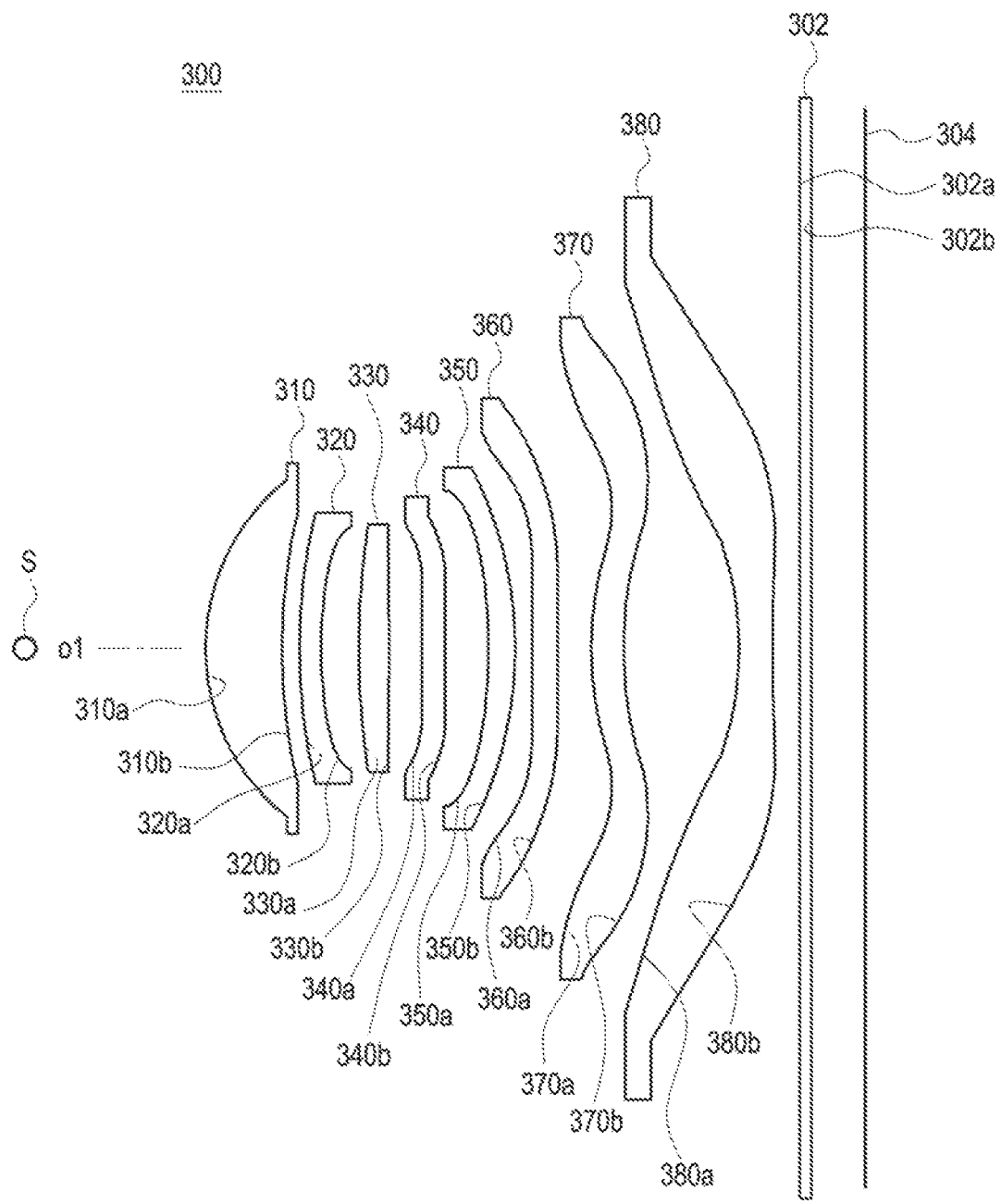
FIG. 6 is a cross-sectional view illustrating a camera module according to one of the various embodiments of the disclosure.
Figure 8:
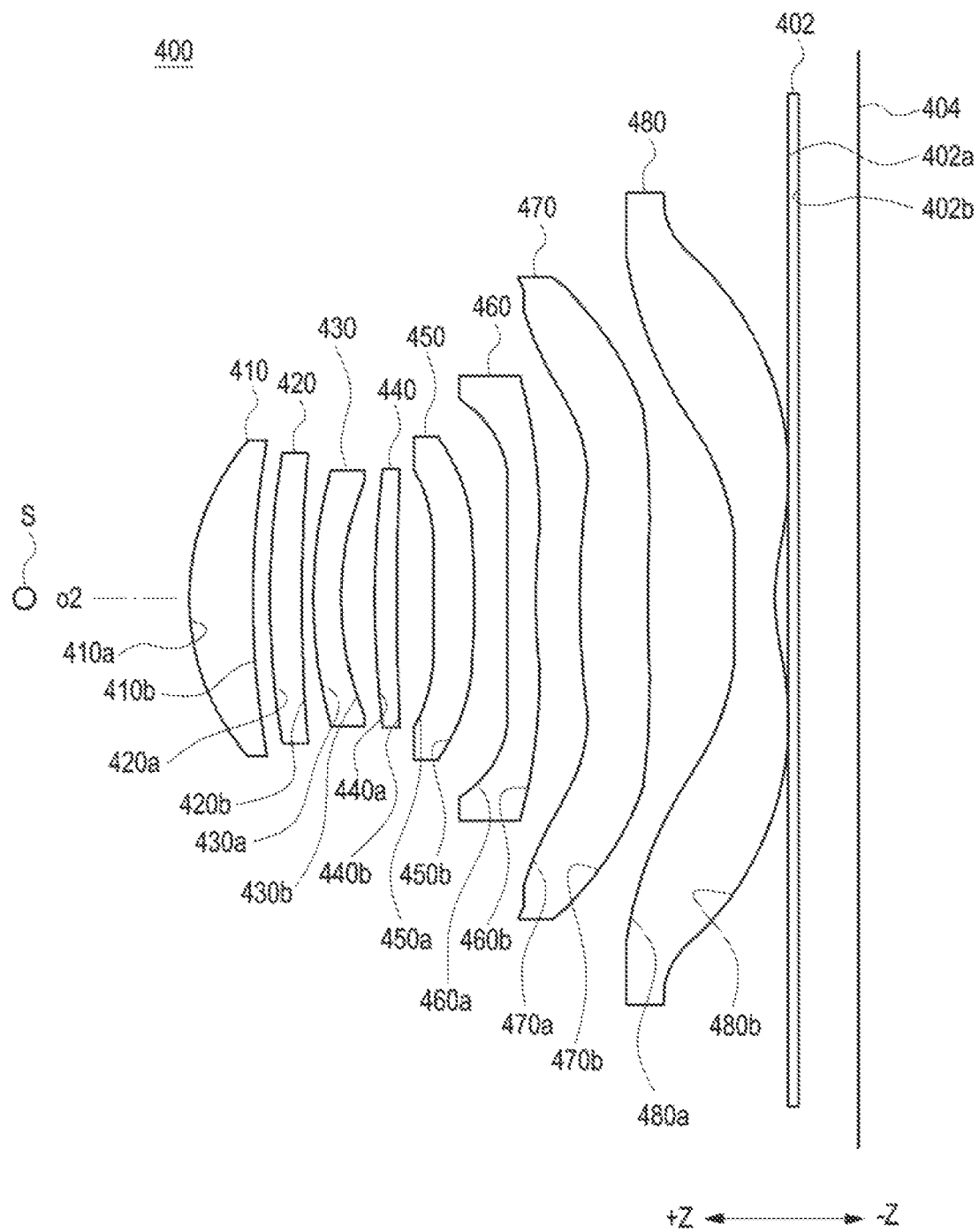
FIG. 8 is a cross-sectional view illustrating a camera module according to another one of the various embodiments of the disclosure.
Figure 10:
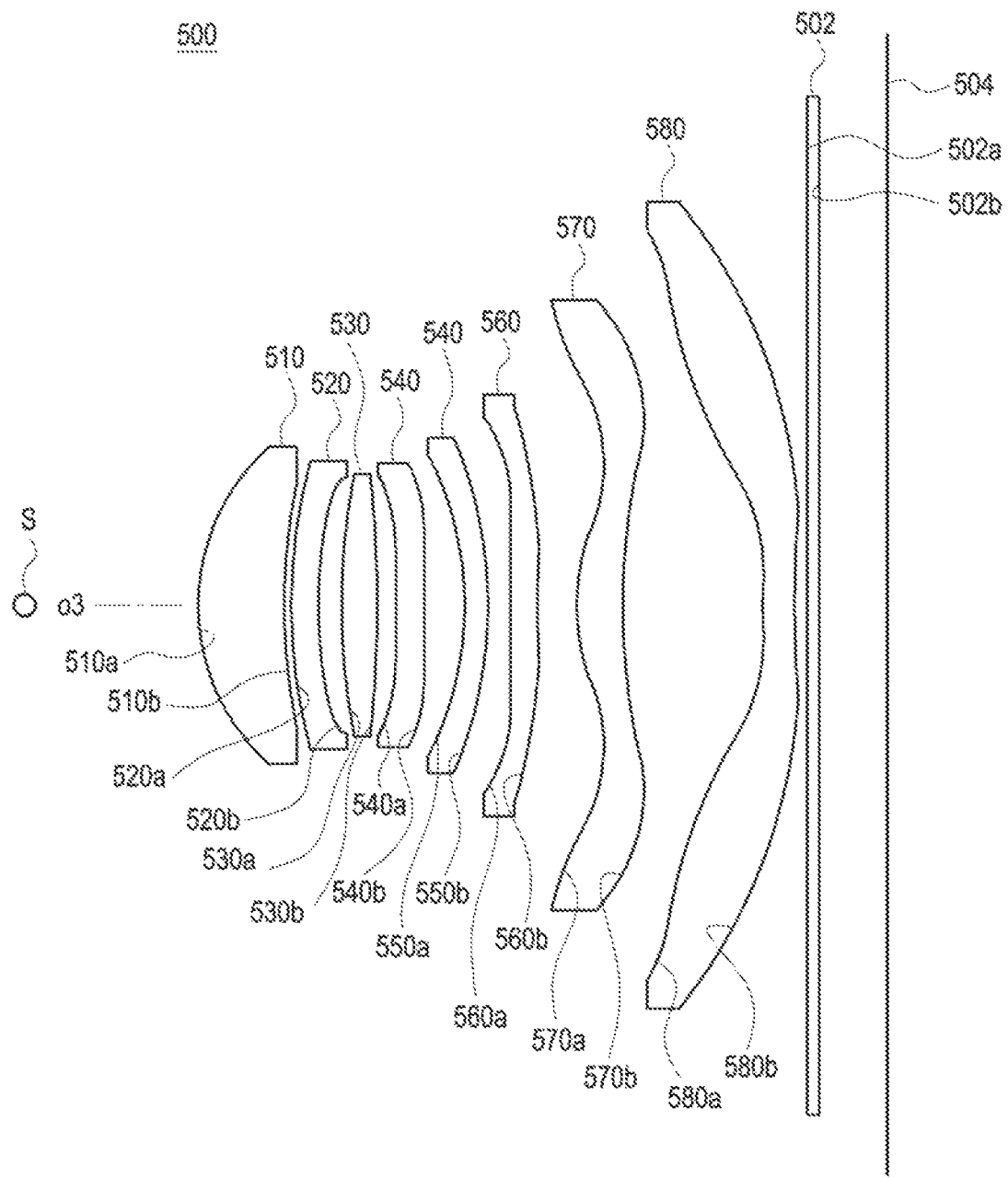
FIG. 10 is a view schematically illustrating a camera module according to yet another one of the various embodiments of the disclosure.

According to an embodiment, the housing 210 may receive a camera module (e.g., the camera module 300 of FIG. 6, the camera module 400 of FIG. 8, or the camera module 500 of FIG. 10).

According to another embodiment (not shown), the electronic device 200 may include a recess or opening formed in a portion of the screen display area (e.g., the front surface 210A) of the display 220 and may include at least one or more of an audio module 214, a sensor module (not shown), a light emitting device (not shown), and a camera module 205 aligned with the recess or opening. According to another embodiment (not shown), at least one or more of the audio module (not shown), sensor module (not shown), camera module 205, fingerprint sensor (not shown), and light emitting device (not shown) may be included on the rear surface of the screen display area of the display 220.

According to an embodiment (not shown), the display 220 may be disposed to be coupled with, or adjacent, a touch detecting circuit, a pressure sensor capable of measuring the strength (pressure) of touches, and/or a digitizer for detecting a stylus pen transmitting an electromagnetic field.

In some embodiments, at least a portion of the key input device 217 may be disposed on the side bezel structure 218.

According to an embodiment, the audio modules 203, 207, and 214 may include, e.g., a microphone hole 203 and speaker holes 207 and 214. The microphone hole 203 may have a microphone inside to obtain external sound. According to an embodiment, there may be a plurality of microphones to be able to detect the direction of the sound. The speaker holes 207 and 214 may include an external speaker hole 207 and a phone receiver hole 214. According to an embodiment, the speaker holes 207 and 214 and the microphone hole 203 may be implemented as a single hole, or speakers may be included without the speaker holes 207 and 214 (e.g., piezo speakers).

According to an embodiment, the sensor modules (not shown) may generate electrical signals or data value corresponding to an internal operating state or external environmental state of the electronic device 200. The sensor module (not shown) may include, e.g., a first sensor module (not shown) (e.g., proximity sensor) and/or a second sensor module (not shown) (e.g., fingerprint sensor) disposed on the front surface 210A of the housing 210. The sensor module (not shown) may include a third sensor module (not shown) (e.g., heartrate monitor (HRM) sensor) and/or a fourth sensor module (not shown) (e.g., fingerprint sensor) disposed on the rear surface 210B of the housing 210). In an embodiment (not shown), the fingerprint sensor may be disposed on the rear surface 210B as well as on the front surface 210A (e.g., the display 220) of the housing 210. The electronic device 200 may include a sensor module not shown, e.g., at least one of gesture sensor, gyro sensor, barometric sensor, magnetic sensor, acceleration sensor, grip sensor, color sensor, infrared (IR) sensor, biometric sensor, temperature sensor, humidity sensor, or illuminance sensor.

According to an embodiment, the camera modules 205 and 206 may include, e.g., a front camera module 205 disposed on the first surface 210A of the electronic device 200 and a rear camera module 206 disposed on the rear surface 210B. The camera modules 205 and 206 may include at least one lens, an image sensor, and/or an image signal processor. According to an embodiment, two or more lenses (infrared (IR) camera, wide-angle lens, and telescopic lens) and image sensors may be disposed on one surface of the electronic device 200.

According to an embodiment, the electronic device 200 may include a flash 204. For example, the flash 204 may include a light emitting diode or a xenon lamp.

According to an embodiment, the key input device 217 may be disposed on the side surface 210C of the housing 210. According to an embodiment, the electronic device 200 may exclude all or some of the above-mentioned key input devices 217 and the excluded key input devices 217 may be implemented in other forms, e.g., as soft keys, on the display 220.

According to an embodiment, the light emitting device (not shown) may be disposed on, e.g., the front surface 210A of the housing 210. The light emitting device (not shown) may provide, e.g., light patterns that correspond to information about the state of the electronic device 200. According to another embodiment, the light emitting device (not shown) may provide a light source (e.g. flash) that works together with, e.g., the front camera module 205. The light emitting device (not shown) may include, e.g., light emitting diode (LED), infrared (IR) LED, and/or xenon lamp.

According to an embodiment, the connector holes 208 and 209 may include a first connector hole 208 for receiving a connector (e.g., earphone jack) for transmitting/receiving audio signals to/from an external electronic device or a connector (e.g., USB connector) for transmitting/receiving power and/or data to/from the external electronic device and/or a second connector hole 209 for receiving a storage device (e.g., subscriber identification module (SIM) card). According to an embodiment, the first connector hole 208 and/or the second connector hole 209 may be omitted.

Figure 4:
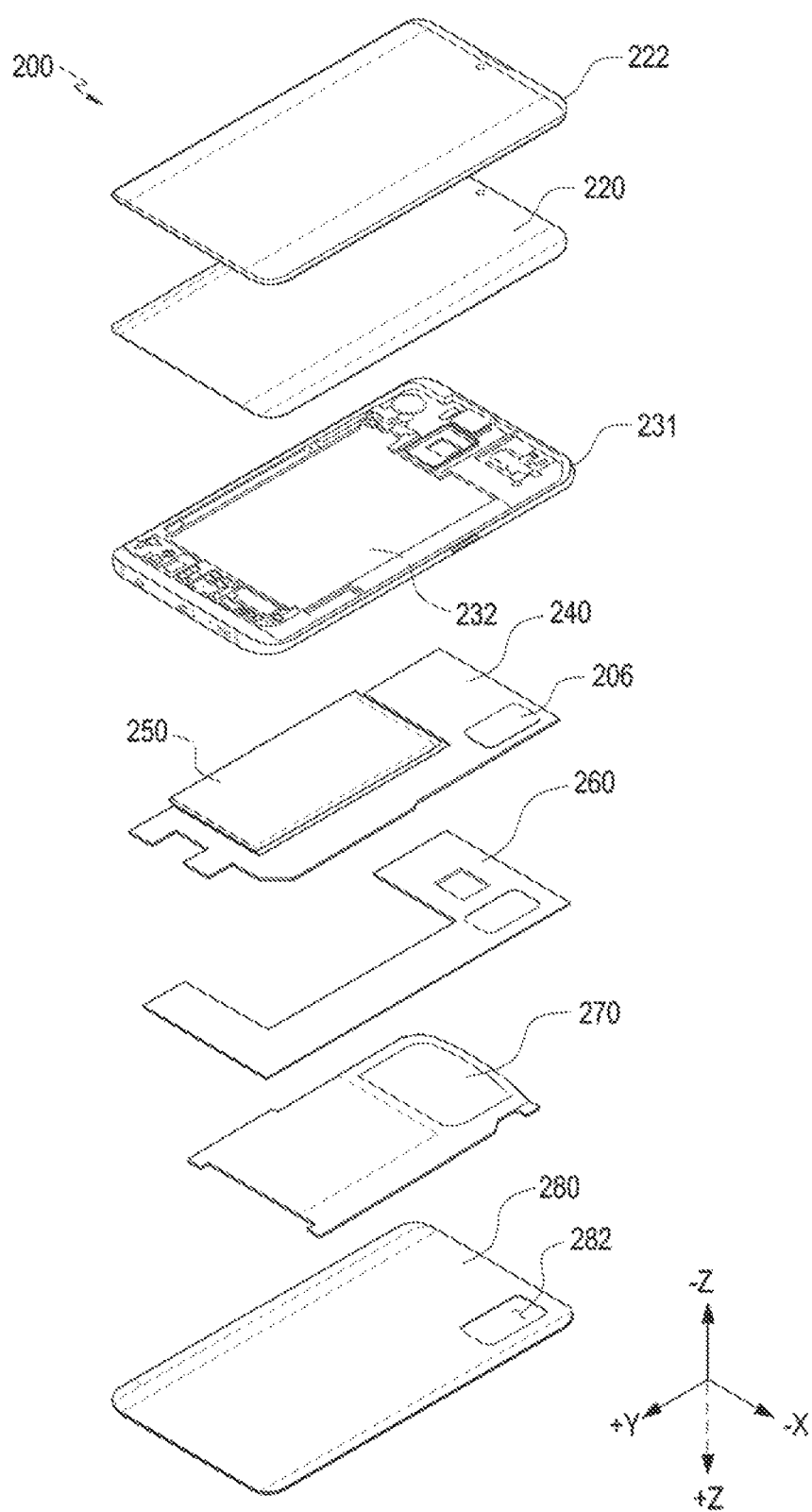
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, an electronic device 200 (e.g., the electronic device 200 of FIGS. 2 and 3) may include a front plate 222 (e.g., the front plate 202), a display 220 (e.g., the display 220 of FIG. 2), a first supporting member 232 (e.g., a bracket), a printed circuit board 240, a battery 250, a second supporting member 260 (e.g., a rear case), an antenna 270, and/or a rear plate 280 (e.g., the rear plate 211 of FIG. 3). According to an embodiment, the electronic device 200 may exclude at least one (e.g., the first supporting member 232 or the second supporting member 260) of the components or may add other components. At least one of the components of the electronic device 200 may be the same or similar to at least one of the components of the electronic device 200 of FIG. 2 or 3 and no duplicate description is made below.

According to an embodiment, the first supporting member 232 may be disposed inside the electronic device 200 to be connected with the side bezel structure 231 or integrated with the side bezel structure 231. The first supporting member 232 may be made of, e.g., metallic material and/or non-metallic material (e.g., polymer). The display 220 may be joined onto one surface of the first supporting member 232, and the printed circuit board 240 may be joined onto the opposite surface of the first supporting member 311. Processor, memory, and/or interface may be mounted on the printed circuit board 240. The processor may include one or more of, e.g., central processing unit, application processor, graphic processing device, image signal processing, sensor hub processor, or communication processor. According to an embodiment, the memory may include, e.g., volatile or non-volatile memory. According to an embodiment, the interface may include, e.g., high definition multimedia interface (HDMI), universal serial bus (USB) interface, secure digital (SD) card interface, and/or an audio interface. The interface may electrically or physically connect, e.g., the electronic device 200 with an external electronic device and may include a USB connector, an SD card/multimedia card (MMC) connector, or an audio connector. According to an embodiment, the battery 250 may be a device for supplying power to at least one component (e.g., the first image sensor of the camera module 206) of the electronic device 200. The battery 250 may include, e.g., primary cell which is not rechargeable, secondary cell which is rechargeable, or fuel cell. At least a portion of the battery 250 may be disposed on substantially the same plane as the printed circuit board 240. The battery 250 may be integrally or detachably disposed inside the electronic device 200.

According to an embodiment, the second supporting member 260 (e.g., rear case) may be disposed between the printed circuit board 240 and the antenna 270. For example, the second supporting member 260 may include one surface to which at least one of the printed circuit board 240 and the battery 250 is coupled, and another surface to which the antenna 270 is coupled.

According to an embodiment, the antenna 270 may be disposed between the rear plate 280 and the battery 250. The antenna 270 may include, e.g., near-field communication (NFC) antenna, wireless charging antenna, and/or magnetic secure transmission (MST) antenna. The antenna 270 may perform short-range communication with, e.g., an external device or may wirelessly transmit or receive power necessary for charging. For example, the antenna 270 may include a coil for wireless charging. According to an embodiment of the present invention, an antenna structure may be formed by a portion or combination of the side bezel structure 231 and/or the first supporting member 232.

According to an embodiment, the electronic device 200 may include a camera module 206 (e.g., the rear camera module 206 of FIG. 3) disposed in the housing (e.g., the housing 210 of FIG. 2). According to an embodiment, the camera module 206 may be disposed on the first supporting member 232 and may obtain images of subjects positioned behind (e.g., the +Z direction) of the electronic device 200. According to an embodiment, at least a portion of the camera module 206 may be visually exposed to the outside of the electronic device 200 through the opening 282 formed in the rear plate 280.

The electronic device 200 disclosed in FIGS. 2 to 4 has a bar-type or plate-type appearance but the disclosure is not limited thereto. For example, the illustrated electronic device may be a rollable electronic device or a foldable electronic device. "Rollable electronic device" may mean an electronic device at least a portion of which may be wound or rolled or received in a housing (e.g., the housing 210 of FIG. 2) as the display (e.g., the display 220 of FIG. 4) may be bent and deformed. As the display is stretched out or is exposed to the outside in a larger area according to the user's need, the rollable electronic device may use an expanded second display area. "Foldable electronic device" may mean an electronic device that may be folded in directions to face two different areas of the display or in directions opposite to each other. In general, in the portable state, the foldable electronic device may be folded so that the two different areas of the display face each other and, in an actual use state, the user may unfold the display so that the two different areas form a substantially flat shape. In some embodiments, according to certain embodiments of the disclosure, the electronic device 200 may be interpreted as including various electronic devices, such as laptop computers or cameras, as well as other portable electronic device, such as smart phones.

Figure 5:
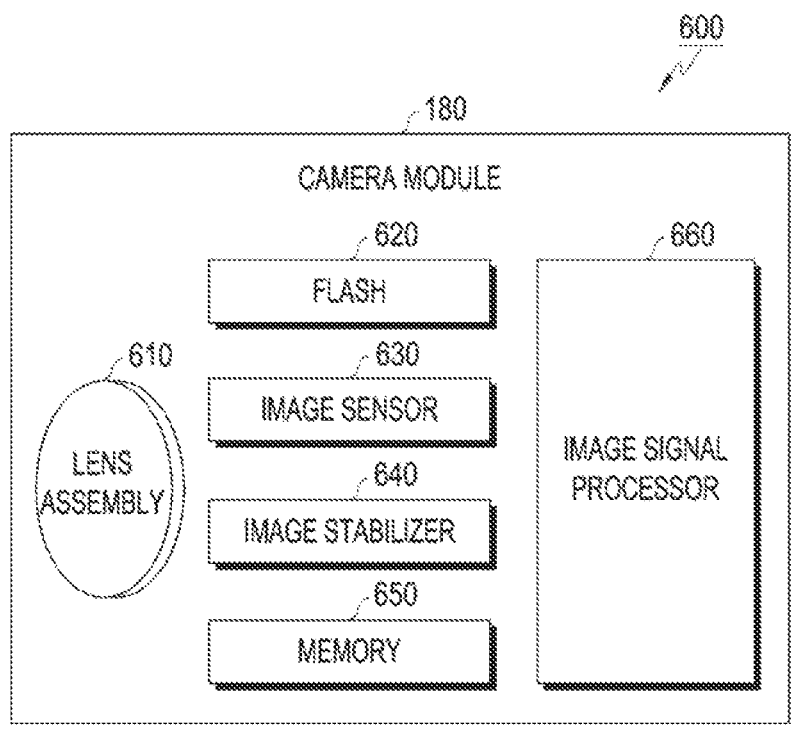
FIG. 5 is a block diagram illustrating a camera module according to an embodiment of the disclosure.

FIG. 5 is a block diagram 600 illustrating a camera module 180 according to an embodiment of the disclosure.

Referring to FIG. 5, the camera module 180 may include a lens assembly 610, a flash 620, an image sensor 630, an image stabilizer 640, memory 650 (e.g., buffer memory), or an image signal processor 660. The lens assembly 610 may collect light emitted or reflected from an object whose image is to be taken. The lens assembly 610 may include one or more lenses. According to an embodiment, the camera module 180 may include a plurality of lens assemblies 610. In such a case, the camera module 180 may form, for example, a dual camera, a 360-degree camera, or a spherical camera. Some of the plurality of lens assemblies 610 may have the same lens attribute (e.g., view angle, focal length, auto-focusing, f number, or optical zoom), or at least one lens assembly may have one or more lens attributes different from those of another lens assembly. The lens assembly 610 may include, for example, a wide-angle lens or a telephoto lens.

The flash 620 may emit light that is used to reinforce light reflected from an object. According to an embodiment, the flash 620 may include one or more light emitting diodes (LEDs) (e.g., a red-green-blue (RGB) LED, a white LED, an infrared (IR) LED, or an ultraviolet (UV) LED) or a xenon lamp. The image sensor 630 may obtain an image corresponding to an object by converting light emitted or reflected from the object and transmitted via the lens assembly 610 into an electrical signal. According to an embodiment, the image sensor 630 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 630 may be implemented using, for example, a charged coupled device (CCD) sensor or a complementary metal oxide semiconductor (CMOS) sensor.

The image stabilizer 640 may move the image sensor 630 or at least one lens included in the lens assembly 610 in a particular direction, or control an operational attribute (e.g., adjust the read-out timing) of the image sensor 630 in response to the movement of the camera module 180 or the electronic device (e.g., the electronic device 200 of FIG. 2) including the camera module 180. This allows compensating for at least part of a negative effect (e.g., image blurring) by the movement on an image being captured. According to an embodiment, the image stabilizer 640 may sense such a movement by the camera module 180 or the electronic device 200 using a gyro sensor (not shown) or an acceleration sensor (not shown) disposed inside or outside the camera module 180. According to an embodiment, the image stabilizer 640 may be implemented, for example, as an optical image stabilizer. The memory 650 may store, at least temporarily, at least part of an image obtained via the image sensor 630 for a subsequent image processing task. For example, if image capturing is delayed due to shutter lag or multiple images are quickly captured, a raw image obtained (e.g., a Bayer-patterned image, a high-resolution image) may be stored in the memory 650, and its corresponding copy image (e.g., a low-resolution image) may be previewed via the display module (e.g., the display module 160 of FIG. 1). Thereafter, if a specified condition is met (e.g., by a user's input or system command), at least part of the raw image stored in the memory 650 may be obtained and processed, for example, by the image signal processor 660. According to an embodiment, the memory 650 may be configured as at least part of the memory 650 or as a separate memory that is operated independently from the memory 130.

The image signal processor 660 may perform one or more image processing with respect to an image obtained via the image sensor 630 or an image stored in the memory 650. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 660 may perform control (e.g., exposure time control or read-out timing control) with respect to at least one (e.g., the image sensor 630) of the components included in the camera module 180. An image processed by the image signal processor 660 may be stored back in the memory 650 for further processing, or may be provided to an external component (e.g., the memory 130, the display module 160, the electronic device 102, the electronic device 104, or the server 108 of FIG. 1) outside the camera module 180. According to an embodiment, the image signal processor 660 may be configured as at least part of the processor (e.g., the processor 120 of FIG. 1), or as a separate processor that is operated independently from the processor 120. If the image signal processor 660 is configured as a separate processor from the processor 120, at least one image processed by the image signal processor 660 may be displayed, by the processor 120, via the display module 160 as it is or after being further processed.

According to an embodiment, the electronic device (e.g., the electronic device 200 of FIG. 2) may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

FIG. 6 is a cross-sectional view illustrating a camera module 300 according to one of the various embodiments of the disclosure.

Referring to FIG. 6, the camera module 300 may include a plurality of lenses 310, 320, 330, 340, 350, 360, 370, and 380 and an image sensor 304. The configuration of the camera module 300 of FIG. 6 may be identical in whole or part to the configuration of the camera module 180 of FIG. 5.

According to an embodiment, at least a portion of the camera module 300 may be disposed in the housing (e.g., the housing 210 of FIG. 2). According to an embodiment, the camera module 300 may be referred to as an imaging optical system. Hereinafter, in describing the configuration of the camera module, the subject S side may indicate the direction in which the object is positioned.

According to an embodiment, the camera module 300 may include a plurality of (e.g., 8 or more) lenses. For example, the camera module 300 may include a first lens 310, a second lens 320, a third lens 330, a fourth lens 340, a fifth lens 350, a sixth lens 360, a seventh lens 370, and an eighth lens 380. According to an embodiment, the first lens 310, the second lens 320, the third lens 330, the fourth lens 340, the fifth lens 350, the sixth lens 360, the seventh lens 370, and the eighth lens 380 may be sequentially arranged in the direction from the subject S to the image sensor 304 along the optical axis O. According to an embodiment, the first lens 310, the second lens 320, the third lens 330, the fourth lens 340, the fifth lens 350, the sixth lens 360, the seventh lens 370 and/or the eighth lens 380 may be a plastic lens. Further, according to an embodiment, the camera module may include at least one aspherical lens. For example, at least one of the first to eighth lenses 310, 320, 330, 340, 350, 360, 370, and 380 may be a double aspherical lens.

According to an embodiment, the first lens 310 may have positive (+) refractive power. For example, the light passing through the first lens 310 may be focused. For example, the lens with positive refractive power may be a convex lens. According to an embodiment, the first lens 310 may include a 1-1th surface 310a facing the subject S side and a 1-2th surface 310b opposite to the 1-1th surface 310a. According to an embodiment, the 1-1th surface 310a may be convex. For example, the first lens 310 may be a meniscus lens convex toward the subject S side. The 1-1th surface 310a may be convex, so that increase in spherical aberration due to increase in the aperture of the camera module 300 may be reduced. For example, the spherical aberration of the camera module 300 including the first lens 310 having the convex 1-1th surface 310a may be smaller than the spherical aberration of another camera module (not shown) that includes a first lens having flat or concave 1-1th surface.

According to an embodiment, the second lens 320 and the third lens 330 may have negative (−) composite refractive power. For example, when parallel light is incident on a lens having negative refractive power (or lenses having negative composite refractive power), the light passing through the lens may disperse. For example, the lens with negative refractive power may be a concave lens. For example, the light passing through the second lens 320 and the third lens 330 may be scattered. According to an embodiment, the camera module 300 may include a stop (e.g., stop ST in Table 1 but not shown in FIG. 6) disposed between the second lens 320 and the third lens 330. For example, as the size of the stop, which relates to the F-number of the camera module 300, is adjusted, the intensity of light transferred to the image sensor 304 may be adjusted. According to an embodiment, the stop ST may be a virtual plane or flat surface formed or defined by a structure including an aperture and a shuttering portion and may be a virtual plane or flat surface including an aperture through which light is incident. For example, the shuttering portion (not shown) may adjust the size of the aperture (e.g., the physical amount of the light entering the lens). Further, the stop ST may be implemented as, an aperture stop, a variable stop, or a mask-type stop.

According to an embodiment (e.g., FIGS. 6 and 10), the stop may be disposed on the 2-2th surface 320b of the second lens 320. According to an embodiment (e.g., FIG. 8), the stop may be disposed on a 3-1th surface (e.g., the 3-1th surface 430a of FIG. 8) of the third lens (e.g., the third lens 430 of FIG. 8). According to an embodiment, the second lens 320 and the third lens 330 may meet the conditional equation 5 below.

According to an embodiment, the fourth lens 340 may include a 4-1th surface 340a facing the subject S side and a 4-2th surface 340b opposite to the 4-1th surface 340a.

According to an embodiment, the fifth lens 350 may include a 5-1th surface 350a facing the subject S side and a 5-2th surface 350b opposite to the 5-1th surface 350a. According to an embodiment, the 5-1th surface 350a may be concave, and the 5-2th surface 350b may be convex. For example, to control aberration correction (e.g., coma aberration) of the lens periphery, it may be an aspherical lens. According to an embodiment, the fifth lens 350 may have negative (−) refractive power.

According to an embodiment, the sixth lens 360 may include a 6-1th surface 360a facing the subject S side and a 6-2th surface 360b opposite to the 6-1th surface 360a.

According to an embodiment, the seventh lens 370 may include a 7-1th surface 370a facing the subject S side and a 7-2th surface 370b opposite to the 7-1th surface 370a. According to an embodiment, the 7-1th surface 370a may include at least one inflection point. The inflection point may indicate, e.g., a point where the sign of the radius of curvature changes from (+) to (−) or from (−) to (+). The inflection point may denote a point where the shape of the lens changes from convex to concave or from concave to convex. The radius of curvature may denote a value or degree of curvature at each point on a curve or curved surface.

According to an embodiment, at least a portion of the 7-1th surface 370a may be convex. For example, as the 7-1th surface 370a (e.g., the area around the optical axis O1 the subject S side) is convex, the incident angle of the light incident on the seventh lens 370 is reduced, so that the amount of light at the periphery may be increased, and the image quality of the central area (e.g., the area adjacent to the optical axis O1) and the peripheral area may be enhanced. For example, the amount of light incident at the periphery through the seventh lens 370 having the convex 7-1th surface 370a may be larger than the amount of light incident at the periphery through a conventional seventh lens having flat or concave 7-1th surface. The peripheral area may be an area surrounding the central area and may be an area spaced apart from the optical axis, as compared with the central area. Further, as the 7-1th surface 370a of the seventh lens 370 is convex, the total length (e.g., the total track length TTL of the light) of the camera module 300 may be reduced as compared with the total length of a conventional camera module having a seventh lens with flat or concave 7-1th surface. According to an embodiment, the eighth lens 380 may include an 8-1th surface 380a facing the subject S side and an 8-2th surface 380b opposite to the 8-1th surface 380a. According to an embodiment, the 8-2th surface 380b may include at least one inflection point. Since the 8-2th surface 380b may include at least one inflection point, the curvature of field may be reduced. According to an embodiment, the eighth lens 380 may have negative (−) refractive power.

According to an embodiment, the image sensor 304 may output an image signal based on the light passing through the plurality of lenses 310, 320, 330, 340, 350, 360, 370, and 380. For example, the image sensor 304 is a semiconductor that converts the obtained light into a digital signal and may be a solid image sensor, such as a charge-coupled device (CCD) or a complementary metal-oxide semiconductor (CMOS). According to an embodiment, the image sensor 304 may be mounted in the camera module (e.g., the camera module 206 of FIG. 3) or an electronic device (e.g., the electronic device 200 of FIG. 2). According to other embodiments, the image sensor 304 is not limited thereto and may be a device that converts an image of the subject S into an electrical image signal. According to an embodiment, the camera module 300 may include an optical filter 302. According to an embodiment, the optical filter 302 may be disposed between the eighth 380 and the image sensor 304. According to an embodiment, the optical filter 302 may be a low pass filter, an infrared (IR) cut filter, and/or a cover glass. For example, the optical filter 302 (e.g., infrared cut filter) may allow the color of the image detected and captured by the image sensor 304 to be closer to the actual color which a human sees for the object. According to an embodiment, the infrared cut filter may transmit wavelengths in the visible light band and reduce or block wavelengths in the infrared band. For example, if the optical filter 302 of the camera module 300 includes an infrared cut filter, the wavelength in the infrared band transferred to the image sensor 304 may be reduced. According to an embodiment, the optical filter 302 may be excluded from the camera module 300.

According to an embodiment, a micro lens layer (not shown) may be further formed on the image sensor 304. The structure in which the plurality of lenses or filter is formed is not limited to those described above, and additional lenses or filters may be used, or at least one of the plurality of lenses may be omitted.

Table 1 below shows the radius of curvature, thickness or air gap, effective diameter, refractive index, and Abbe number of the first lens 310, the second lens 320, the third lens 330, the fourth lens 340, the fifth lens 350, the sixth lens 360, the seventh lens 370, and the eighth lens 380 of the camera module 300. The configuration of the first lens 310, the second lens 320, the third lens 330, the fourth lens 340, the fifth lens 350, the sixth lens 360, the seventh lens 370, the eighth lens 380, the optical filter 302, and the image sensor 304 according to the first embodiment (e.g., FIG. 6) may meet the conditions of Table 1.

According to an embodiment, the F-number, composite effective focal length (EFL) and/or field of view (FOV) of the camera module 300 may vary according to the design of the camera module. According to an embodiment (e.g., the first embodiment), the F-number of the camera module 300 may be 1.9, the composite effective focal length may be 6.55 mm, and the field of view may be 83 degrees.

TABLE 1

| | Radius of curvature (mm) | Thickness or air gap (mm) | Effective diameter (mm) | Refractive index (nd) | Abbe number (vd) |
|---|---|---|---|---|---|
| obj | infinity | | | | |
| p | infinity | | | | |
| 310a | 2.257 | 0.886 | 5.53 | 1.5441 | 56.11 |
| 310b | 7.679 | 0.071 | | | |
| 320a | 7.244 | 0.252 | −14.187 | 1.67975 | 18.41 |
| 320b(ST) | 4.1 | 0.378 | | | |
| 330a | 15.752 | 0.332 | 55.762 | 1.56717 | 37.4 |
| 330b | 30.95 | 0.232 | | | |
| 340a | 12.17 | 0.257 | 87.876 | 1.67073 | 19.23 |
| 340b | 15.159 | 0.427 | | | |
| 350a | −5.225 | 0.241 | −42.993 | 1.5441 | 56.11 |
| 350b | −6.829 | 0.213 | | | |
| 360a | 11.744 | 0.306 | infinity | 1.56717 | 37.4 |
| 360b | 11.636 | 0.361 | | | |

TABLE 1-continued

| | Radius of curvature (mm) | Thickness or air gap (mm) | Effective diameter (mm) | Refractive index (nd) | Abbe number (vd) |
|---|---|---|---|---|---|
| 370a | 2.615 | 0.349 | 10.363 | 1.5346 | 56.27 |
| 370b | 4.703 | 1.295 | | | |
| 380a | −10.649 | 0.407 | −5.011 | 1.5441 | 56.11 |
| 380b | 3.736 | 0.147 | | | |
| 302a | infinity | | | | |
| 302b | infinity | | | | |
| 304 | infinity | | | | |

In Table 1 and/or Table 2 below, 'obj' may mean the subject S, 'p' the front surface of the camera module, '310a' and '310b' the front surface (1-1th surface) and rear surface (1-2th surface), respectively, of the first lens 310, '320a' and '320b' the front surface (2-1th surface) and rear surface (2-2th surface), respectively, of the second lens 320, '330a' and '330b' the front surface (3-1th surface) and rear surface (3-2th surface), respectively, of the third lens 330, '340a' and '340b' the front surface (4-1th surface) and rear surface (4-2th surface), respectively, of the fourth lens 340, '350a' and '350b' the front surface (5-1th surface) and rear surface (5-2th surface), respectively, of the fifth lens 350, '360a' and '360b' the front surface (6-1th surface) and rear surface (6-2th surface), respectively, of the sixth lens 360, '370a' and '370b' the front surface (7-1th surface) and rear surface (7-2th surface), respectively, of the seventh lens 370, '380a' and '380b' the front surface (8-1th surface) and rear surface (8-2th surface), respectively, of the eighth lens 380. '302a' and '302b' may mean the front and rear surfaces, respectively, of the optical filter 302. '304' may mean the image plane of the image sensor 304. For example, the image plane of the image sensor 304 may be interpreted as the front surface of the image sensor 304 for receiving light. The unit of the radius of curvature, thickness, air gap and effective diameter in Table 1 may be mm. At least a portion of the front surface may face in a first direction (e.g., object-side direction (+Z direction)) facing the subject S, and at least a portion of the rear surface may face in a second direction (e.g., image-side direction (−Z direction)) facing the image sensor 304. In describing the configuration of each lens below, the image side may indicate the direction in which, e.g., the image plane 304 on which an image is formed is positioned, and the object side may indicate the direction in which the subject S is present. The "object side surface" of each lens is the lens surface on the side facing the subject S with respect to the optical axis O1 and may mean the surface on which light is incident with respect to the optical axis O1. The "image side surface" is the lens surface on the side facing the image plane 304 with respect to the optical axis O1 and may indicate the surface where light exits with respect to the optical axis O1.

According to an embodiment, the camera module 300 may meet conditional equation 1 below.

$$1 < \frac{f}{f1} < 2 \quad \text{[Conditional equation 1]}$$

According to an embodiment, f may mean the composite focal length of the camera module 300, and f1 may mean the focal length of the first lens 310. According to an embodiment, conditional equation 1 above may be a condition for correcting aberration (e.g., spherical aberration) while providing a miniaturized camera module 300. According to an embodiment, when the ratio of the composite focal length of the camera module 300 to the focal length of the first lens 310 is 1 or less, the size of the camera module 300 may be increased. According to an embodiment, when the ratio of the composite focal length of the camera module 300 to the focal length of the first lens 310 is 2 or more, the difficulty of correcting aberration may increase due to the refractive power of the first lens 310.

According to an embodiment, the camera module 300 may meet conditional equation 2 below.

$$0.4 < \frac{TTL}{IH*2} < 0.62 \quad \text{[Conditional equation 2]}$$

According to an embodiment, total track length (TTL) may mean the distance from the outermost surface of the camera module 300 to the image plane of the image sensor 304. According to an embodiment, if the optical filter 302 (e.g., infrared cut filter, cover glass) is provided on the optical axis O1, an air conversion value may be applied to the TTL. For example, when the refractive index and thickness of the optical filter 302 are n and d, respectively, a value of $(1-(1/n))*d$ may be applied when calculating TTL. According to an embodiment, IH may mean the image height at clear aperture. For example, an area in a lens, through which most of the light substantially passes or light beams which may serve as the center in obtaining an image pass may be defined as "clear aperture," and the image height may be half the diagonal length of the image sensor 304. According to an embodiment, the camera module 300 meeting conditional equation 2 (e.g., slim factor) may be reduced in size. According to an embodiment, to block entrance of the light reflected by the camera module 300, a light blocking member (not shown) may be positioned around the first lens 310, corresponding to the size of the clear aperture where most of the light beams pass.

According to an embodiment, the camera module 300 may meet conditional equation 3 below.

$$50 < L8 \ Vd < 70 \quad \text{[Conditional equation 3]}$$

According to an embodiment, L8 Vd may mean the Abbe number of the eighth lens 380. For example, Abbe number (Vd) may be defined using at least one of C line (wavelength 656.3000 nm), d line (wavelength 587.6000 nm), e line (wavelength 546.1000 nm), f line (wavelength 486.1000 nm), or g line (wavelength 435.8000 nm). According to an embodiment, the Abbe number (Vd) may meet Equation 2 below when the respective refractive indexes for C line (wavelength 656.3000 nm), d line (wavelength 587.6000 nm), and f line (wavelength 486.1 nm) are nc, nd, and nf, respectively. The Abbe number Vd may meet Equation 2 below.

$$Vd = \frac{nd-1}{nf-nc} \quad \text{[Equation 2]}$$

According to another embodiment, the Abbe's number (Vd) may be defined using the refractive indexes for C' line (wavelength 643.9000 nm), e line (wavelength 546.1000 nm), and F' line (wavelength 488.0 nm). For example, when the respective refractive indexes of the C' line, the e line, and the F' line are nc', ne, and nF', respectively, the Abbe number Vd may meet Equation 3 below.

$$Vd = \frac{ne-1}{nF'-nc'} \quad \text{[Equation 3]}$$

For example, the Abbe number of the eighth lens 380 may be defined as an Abbe number of wavelength of 587.6000 nm or wavelength of 546.1000 nm. Conditional equation 3 is for correcting longitudinal chromatic aberration and, within a range meeting conditional equation 3, longitudinal chromatic aberration may be properly corrected. According to an embodiment, conditional equation 3 above may be a condition for enhancing the performance of the camera module 300 while providing a miniaturized camera module 300. For example, in the camera module 300 meeting conditional equation 3 above, modulation transfer function (MTF) performance may be increased. For example, an MTF curve substantially coincident with the diffraction limit curve of the camera module 300 may be obtained. Further, it may mean that camera performance having modulation transfer (e.g., contrast input/output ratio) larger than or equal to a designated value for contrast (contrast) in a low frequency band is obtained. According to an embodiment, the eighth lens 380 may include cyclic olefin copolymer (COC), cyclic olefin polymer (COP), or polymethyl methacrylate (PMMA). For example, the eighth lens 380 may be an APEL™-based plastic lens.

According to an embodiment, the camera module 300 may meet conditional equation 4 below.

$$30° < Cra \ \max < 50° \quad \text{[Conditional equation 4]}$$

According to an embodiment, Cra max may mean the maximum angle of the chief ray incident on the image sensor 304 of the camera module 300. According to an embodiment, conditional equation 4 may be a condition for providing a miniaturized camera module 300. According to an embodiment, as the pixel size is reduced, Cra may increase, and the distance between the image sensor 304 and the lens (e.g., the eighth lens 380) may reduce, so that the camera module 300 may be miniaturized.

According to an embodiment, the camera module 300 may meet conditional equation 5 below.

$$-50 \ \text{mm} < efy \ s4 \ldots s7 < 0 \ \text{mm} \quad \text{[Conditional equation 5]}$$

According to an embodiment, efy s4 . . . s7 may mean the composite focal length of the second lens 320 and the third lens 330. According to an embodiment, conditional equation 5 above may be a condition for enhancing the performance of the camera module 300 while providing a miniaturized camera module 300. For example, when efy s4 . . . s7 is 0 mm or more, the positive (+) refractive power of the camera module 300 may increase, the balance of the composite refractive power of the camera module 300 may reduce, and the difficulty in aberration correction (e.g., coma aberration) may increase. According to an embodiment, when efy s4 . . . s7 is −50 mm or less, the composite refractive power of the camera module 300 may reduce so that the size of the camera module 300 may increase.

According to an embodiment, the camera module 300 may meet conditional equation 6 below.

$$17 < vd \ \min < 25 \quad \text{[Conditional equation 6]}$$

According to an embodiment, vd min may mean the minimum value of the Abbe number of the first lens 310, the Abbe number of the second lens 320, the Abbe number of the third lens 330, the Abbe number of the fourth lens 340, the Abbe number of the fifth lens 350, the Abbe number of the sixth lens 360, the Abbe number of the seventh lens 370, and the Abbe number of the eighth lens 380. According to an embodiment, conditional equation 6 may be a condition for enhancing the performance of the camera module 300. According to an embodiment, when vd min is 25 or more, chromatic aberration (e.g., longitudinal chromatic aberration) increases, so that the quality of the image obtained using the camera module 300 may be reduced.

According to an embodiment, the first to eighth lenses 310, 320, 330, 340, 350, 360, 370, and 380 may be made with various materials. For example, at least one of the first to eighth lenses 310, 320, 330, 340, 350, 360, 370, and 380 may include at least one of glass, plastic, crystal, or polycarbonate.

According to an embodiment, the camera module 300 may meet conditional equation 7 below.

$$1.5 < \frac{efl}{epd} < 2.0 \quad \text{[Conditional equation 7]}$$

According to an embodiment, efl may mean the focal length (e.g., effective focal length (efl)) of the camera module 300, and epd may mean the entrance pupil diameter of the camera module 300. For example, $$\frac{efl}{epd}$$

may be the F-number of the camera module 300. According to an embodiment, the camera module 300 meeting conditional equation 7 may obtain sufficient light from the outside of the camera module 300 to capture clear images.

According to an embodiment, the camera module 300 may meet conditional equation 8 below.

L8 S1 sag max sag angle<40°     [Conditional equation 8]

According to an embodiment, L8 S1 sag max sag angle may mean a sag angle (e.g., slant angle), at the maximum sag value of the 8-1th surface 380a of the eighth lens 380. For example, the 8-1th surface 380a formed as an aspherical surface may be inclined or sagged by the sag value at any point. At a point where the sag value is the maximum (e.g., the maximum value among the absolute sag values of the inflection points of the aspherical lens), the angle between the 8-1th surface 380a and the optical axis O1 may be interpreted as the sag angle at the point where the 8-1th surface 380a has the maximum sag value. Here, the sag value means the distance in the direction of the optical axis O1 from the vertex of the lens (e.g., the eighth lens 380). For example, the sag value may mean 'z' in Equation 1 below. For example, in the case of an aspherical lens, the change rate of the sag value may not be uniform. A larger sag value may render it difficult to process the lens but may be advantageous in correcting aberrations.

According to an embodiment, conditional equation 8 may be a condition for reducing or preventing the flare phenomenon.

According to an embodiment, the camera module 300 may include at least one aspherical lens. For example, at least one of the first lens 310, the second lens 320, the third lens 330, the fourth lens 340, the fifth lens 350, the sixth lens 360, the seventh lens 370, or the eighth lens 380 may have at least one surface formed in an aspherical shape. According to an embodiment, at least one of the 5-1th surface 350a and the 5-2th surface 350b of the fifth lens 350 may be formed in an aspherical shape. According to an embodiment, the 8-1th surface 380a and the 8-2th surface 380b of the eighth lens 380 may be formed in an aspherical shape. For example, the eighth lens 380 may be formed of a double aspherical lens (e.g., the subject S side surface and the image sensor 304 side surface may both be aspherical).

The shape of the aspherical lens may be obtained through Equation 1 below. For example, when the direction of the optical axis is the Z axis, the direction perpendicular to the direction of the optical axis is the Y axis (e.g., the Y axis of FIG. 4), and the traveling direction of light is positive, the aspherical shape may be represented as the following equation.

According to certain embodiments, each of the plurality of lenses may include an aspherical lens, and the shape of the aspherical lens may be defined as in Equation 1 below.

$$Z = (h^2/r) / \left(1 + \sqrt{1 - (1+K_{conic}) * \left(\frac{h^2}{r^2}\right)}\right) + A*h^4 + B*h^6 + \quad \text{[Equation 1]}$$
$$C*h^8 + D*h^{10} + E*h^{12} + F*h^{14} + G*h^{16} + H*h^{18} +$$
$$J*h^{20} + K_{22th}*h^{22} + L*h^{24} + M*h^{26} + N*h^{28} + O*h^{30}$$

In Equation 1, 'z' may mean the distance in the optical axis direction from the apex of the lens, 'h' may mean the distance in the direction perpendicular to the optical axis of the lens, 'r' may mean the reciprocal (=1/R) of the radius of curvature at the apex of the lens, 'K' may mean the conic constant, and 'A', 'B', 'C', 'D', 'E', 'F', 'G', 'H', 'I', 'J', 'K($K_{22th}$)', 'L', 'M', 'N', and 'O' may mean aspheric coefficients.

Table 2 below shows the respective aspheric coefficients of the first to eighth lenses 310, 320, 330, 340, 350, 360, 370, and 380. The first to eighth lenses 310, 320, 330, 340, 350, 360, 370, and 380 of the camera module 300 of the first embodiment (e.g., FIGS. 6, 7A, 7B, and 7C) may meet the conditions of Table 2 below.

TABLE 2

| | $K_{conic}$ | A | B | C | D | E | F | G |
|---|---|---|---|---|---|---|---|---|
| 310a | −0.897438 | −0.008287 | 0.1440265 | −0.572124 | 1.3721217 | −2.154554 | 2.33E+00 | −1.774928 |
| 310b | 15.355048 | −0.012063 | −0.125841 | 4.38E−01 | −7.27E−01 | 6.37E−01 | −1.07E−01 | −0.453485 |
| 320a | 17.956242 | −0.057687 | 0.1811487 | −1.00E+00 | 3.84E+00 | −9.19E+00 | 1.47E+01 | −16.60161 |
| 320b | 5.0980261 | −0.05872 | 4.24E−01 | −2.54E+00 | 9.80E+00 | −2.47E+01 | 4.27E+01 | −52.40357 |
| 330a | 118.22585 | −0.002842 | −0.479276 | 4.33E+00 | −2.13E+01 | 6.73E+01 | −1.44E+02 | 218.78772 |
| 330b | 328.88255 | −0.159052 | 1.4122073 | −9.460356 | 40.589698 | −116.7866 | 234.30171 | −336.0092 |
| 340a | −62.77532 | 0.0097294 | −0.893929 | 6.0665643 | −25.45059 | 71.093496 | −138.2025 | 191.99125 |
| 340b | 87.92258 | −0.004687 | −0.343684 | 1.5210036 | −4.548755 | 9.5035636 | −14.2219 | 15.485838 |
| 350a | 7.1538425 | −0.022911 | 0.2734435 | −1.238721 | 3.4543692 | −6.566506 | 8.8134388 | −8.508286 |
| 350b | 7.3021516 | 0.0009424 | 0.037826 | −0.205653 | 0.4850245 | −0.707534 | 0.6946903 | −0.475371 |

TABLE 2-continued

| | | | | | | | | |
|---|---|---|---|---|---|---|---|---|
| 360a | 18.960604 | −0.055857 | −0.011134 | 0.0369286 | 0.0012882 | −0.057468 | 0.0715172 | −0.047335 |
| 360b | −26.66739 | −0.09556 | 0.0194053 | 0.0160437 | −0.003241 | −0.015138 | 0.0158297 | −0.007959 |
| 370a | −7.799461 | 0.0469822 | −0.083487 | 0.0641274 | −0.035097 | 0.0138335 | −0.003982 | 0.0008454 |
| 370b | −18.41972 | 0.0808419 | −0.080006 | 0.0457549 | −0.019633 | 0.0063856 | −0.001572 | 0.0002927 |
| 380a | 0.9189533 | −0.109818 | 0.0634876 | −0.027503 | 0.0093727 | −0.002392 | 0.0004531 | −6.39E−05 |
| 380b | −31.61351 | −0.063769 | 0.0272272 | −0.009225 | 0.0024688 | −0.000526 | 8.84E−05 | −1.15E−05 |

| | H | J | K | L | M | N | O |
|---|---|---|---|---|---|---|---|
| 310a | 0.9700444 | −0.380054 | 0.1054661 | −0.020136 | 0.0024989 | −0.00018 | 5.61E−06 |
| 310b | 0.6381013 | −0.467997 | 0.220057 | −0.068591 | 0.013777 | −0.00162 | 8.49E−05 |
| 320a | 13.482337 | −7.946599 | 3.3738447 | −1.006304 | 0.2001602 | −0.023839 | 0.0012857 |
| 320b | 46.456254 | −29.8747 | 13.822762 | −4.491406 | 0.9744834 | −0.127047 | 0.007546 |
| 330a | −238.034 | 186.86508 | −104.9536 | 41.1293 | −10.67952 | 1.6508469 | −0.114982 |
| 330b | 348.90163 | −262.799 | 142.13146 | −53.77152 | 13.504408 | −2.021926 | 0.1365468 |
| 340a | −193.2047 | 141.13688 | −74.09202 | 27.231679 | −6.649995 | 0.9690067 | −0.063749 |
| 340b | −12.36678 | 7.2382277 | −3.07033 | 0.9193704 | −0.184482 | 0.0222906 | −0.001228 |
| 350a | 5.9605908 | −3.029228 | 1.1040401 | −0.280879 | 0.0473076 | −0.004735 | 0.0002131 |
| 350b | 0.2307378 | −0.079904 | 0.0196106 | −0.003333 | 0.0003729 | −2.47E−05 | 7.34E−07 |
| 360a | 0.020098 | −0.005799 | 0.0011524 | −0.000155 | 1.36E−05 | −6.96E−07 | 1.58E−08 |
| 360b | 0.0024568 | −0.000502 | 6.92E−05 | −6.40E−06 | 3.80E−07 | −1.30E−08 | 1.95E−10 |
| 370a | −0.000132 | 1.51E−05 | −1.24E−06 | 7.07E−08 | −2.67E−09 | 6.00E−11 | −6.06E−13 |
| 370b | −4.10E−05 | 4.27E−06 | −3.23E−07 | 1.72E−08 | −6.05E−10 | 1.26E−11 | −1.18E−13 |
| 380a | 6.69E−06 | −5.15E−07 | 2.88E−08 | −1.13E−09 | 2.94E−11 | −4.57E−13 | 3.19E−15 |
| 380b | 1.14E−06 | −8.48E−08 | 4.61E−09 | −1.77E−10 | 4.55E−12 | −6.96E−14 | 4.80E−16 |

Figure 7A:
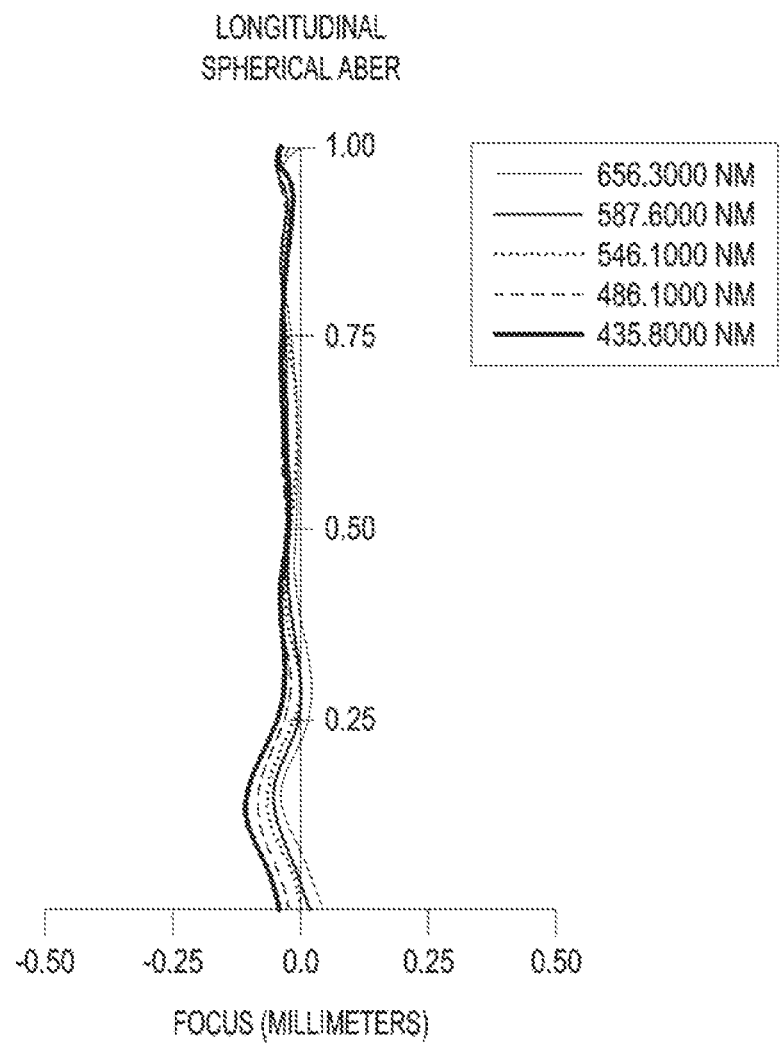
FIG. 7A is a graph illustrating spherical aberration of the camera module of FIG. 6.
Figure 7B:
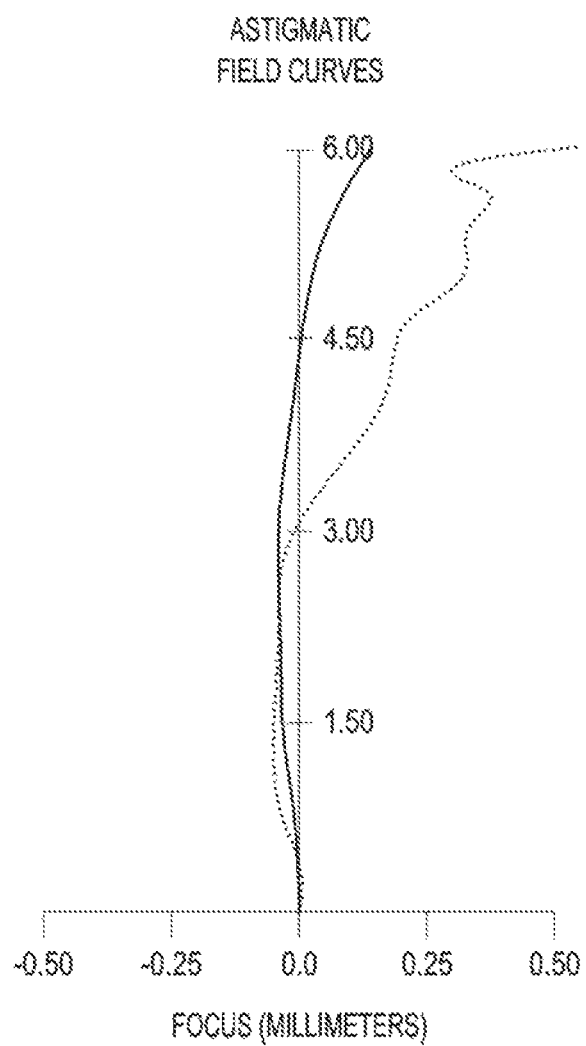
FIG. 7B is a graph illustrating astigmatism of the camera module of FIG. 6.
Figure 7C:
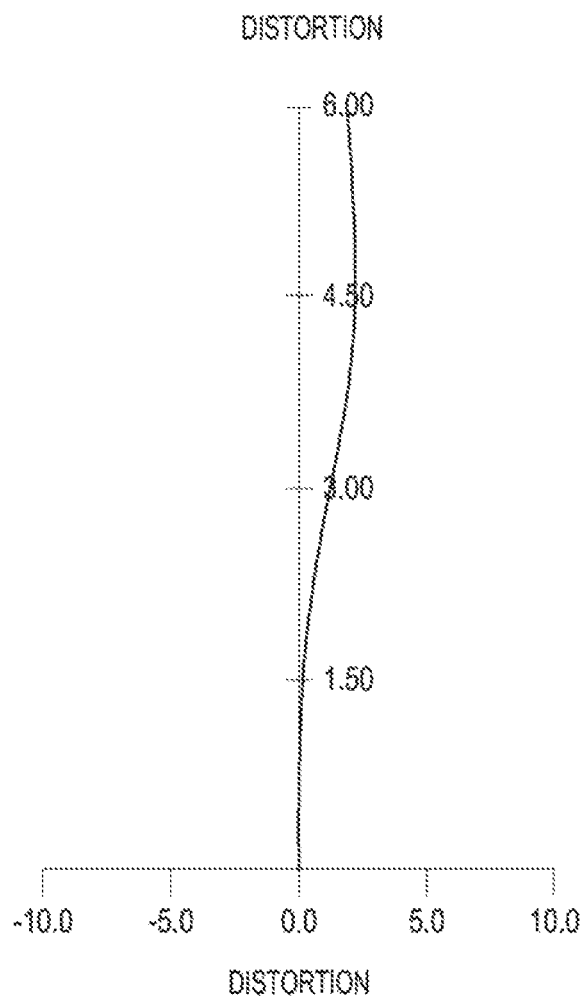
FIG. 7C is a graph illustrating a distortion rate of the camera module of FIG. 6.

FIG. 7A is a graph illustrating spherical aberration of the camera module 300 of FIG. 6. FIG. 7B is a graph illustrating astigmatism of the camera module 300 of FIG. 6. FIG. 7C is a graph illustrating a distortion (distortion rate) of the camera module 300 of FIG. 6.

Referring to FIG. 7A, a change in longitudinal spherical aberration according to the wavelength of light is shown. The horizontal axis of FIG. 7A denotes the coefficient of longitudinal spherical aberration, and the vertical axis of FIG. 7A denotes the normalized distance from the center of the optical axis. According to an embodiment, in FIG. 7A, a change in longitudinal spherical aberration according to the wavelength of light is shown. The longitudinal spherical aberration is caused for light having, e.g., wavelengths of 656.3000 (nm, nanometer) (e.g., red), 587.6000 (nm) (e.g., yellow), 546.1000 (nm), 486.1000 (nm) (e.g., blue), and 435.8000 (nm).

In FIG. 7B, the astigmatic field curves of the camera module 300 are the results obtained at the wavelength of 546.1000 nm. The dotted line denotes the astigmatism (e.g., meridional curvature) in the tangential (or meridional) direction, and the solid line denotes astigmatism (e.g., sagittal curvature) in the sagittal direction. In FIG. 7B, the horizontal axis denotes the coefficient of astigmatism, and the vertical axis denotes the image height. For example, the image captured through the camera module 300 may have image blur, but such distortion merely amounts to a level that may be regularly seen in optical devices with lenses, and may provide good optical properties.

Referring to FIG. 7C, the distortion aberration is shown for the light having wavelength of 546.1000 nm. In the image captured through the camera module 300, distortion occurs at a point spaced apart from the optical axis (e.g., the optical axis O1 in FIG. 6), but the distortion of the camera module 300 may be less than 5%. For example, in the image captured through the camera module 300, pin cushion-type distortion occurs so that the measured image may be enlarged compared to the actual image that is not distorted. However, such distortion merely amounts to a degree that may be seen in a regular optical device using a lens, and the distortion ratio is less than about 2.5%. Thus, good optical properties may be provided.

FIG. 8 is a cross-sectional view illustrating a camera module 400 according to another one of the various embodiments of the disclosure.

Referring to FIG. 8, the camera module 400 may include a plurality of lenses 410, 420, 430, 440, 450, 460, 470, and 480, an optical filter 402, and/or an image sensor 404. The configuration of the camera module 400 of FIG. 8 may be the same in whole or part as the configuration of the camera module 300 of FIG. 6, and no duplicate description is given below.

According to an embodiment, the camera module 400 may include a stop (e.g., stop ST in Table 3) disposed between the second lens 420 and the third lens 430. By adjusting the size of the stop ST, the intensity of the light transferred to the image sensor 404 may be adjusted. According to an embodiment, the stop ST may be disposed on the 3-1th surface 430a of the third lens 430.

Table 3 below shows the radius of curvature, thickness or air gap, effective diameter, refractive index, and Abbe number of the first lens 410, the second lens 420, the third lens 430, the fourth lens 440, the fifth lens 450, the sixth lens 460, the seventh lens 470, and the eighth lens 480 of the camera module 400. The configuration of the first lens 410, the second lens 420, the third lens 430, the fourth lens 440, the fifth lens 450, the sixth lens 460, the seventh lens 470, the eighth lens 480, the optical filter 402, and the image sensor 404 according to the second embodiment (e.g., FIG. 8) may meet the conditions of Table 3.

According to an embodiment, the F-number, composite effective focal length (EFL) and/or field of view (FOV) of the camera module 400 may vary according to the design of the camera module. According to an embodiment (e.g., the second embodiment), the F-number of the camera module 400 may be 1.8, the composite effective focal length may be 6.23 mm, and the field of view may be 85 degrees.

TABLE 3

| | Radius of curvature | Thickness or air gap | Effective diameter | Refractive index | Abbe number |
|---|---|---|---|---|---|
| obj | infinity | | | | |
| p | infinity | | | | |

TABLE 3-continued

| | Radius of curvature | Thickness or air gap | Effective diameter | Refractive index | Abbe number |
|---|---|---|---|---|---|
| 410a | 2.328 | 0.731 | 5.983 | 1.5441 | 56.09 |
| 410b | 7.189 | 0.09 | | | |
| 420a | 9.419 | 0.365 | 46.064 | 1.5441 | 56.09 |
| 420b | 14.843 | 0.02 | | | |
| 430a(ST) | 9.953 | 0.26 | −13.464 | 1.67975 | 18.41 |
| 430b | 4.748 | 0.253 | | | |
| 440a | 10.051 | 0.265 | 40.069 | 1.5441 | 56.09 |
| 440b | 18.406 | 0.315 | | | |
| 450a | −202.156 | 0.442 | −64.05 | 1.67975 | 18.41 |
| 450b | 56.442 | 0.368 | | | |
| 460a | 8.54 | 0.351 | 630.078 | 1.61444 | 25.94 |
| 460b | 8.594 | 0.476 | | | |
| 470a | 5.282 | 0.753 | 11.529 | 1.56717 | 37.4 |
| 470b | 25.378 | 0.949 | | | |
| 480a | 8.332 | 0.45 | −5.106 | 1.5441 | 56.09 |
| 480b | 2.05 | 0.161 | | | |
| 402a | infinity | 0.11 | infinity | 1.5168 | 64.2 |
| 402b | infinity | 0.71 | | | |
| 404 | infinity | −0.02 | | | |

In Table 3 and/or Table 4 below, 'obj' may mean the subject S, 'p' the front surface of the camera module, '410a' and '410b' the front surface (1-1th surface) and rear surface (1-2th surface), respectively, of the first lens 410, '420a' and '420b' the front surface (2-1th surface) and rear surface (2-2th surface), respectively, of the second lens 420, '430a' and '430b' the front surface (3-1th surface) and rear surface (3-2th surface), respectively, of the third lens 430, '440a' and '440b' the front surface (4-1th surface) and rear surface (4-2th surface), respectively, of the fourth lens 440, '450a' and '450b' the front surface (5-1th surface) and rear surface (5-2th surface), respectively, of the fifth lens 450, '460a' and '460b' the front surface (6-1th surface) and rear surface (6-2th surface), respectively, of the sixth lens 460, '470a' and '470b' the front surface (7-1th surface) and rear surface (7-2th surface), respectively, of the seventh lens 470, '480a' and '480b' the front surface (8-1th surface) and rear surface (8-2th surface), respectively, of the eighth lens 480. '402a' and '402b' may mean the front and rear surfaces, respectively, of the optical filter 402. '404' may mean the image plane of the image sensor 404. The unit of the radius of curvature, thickness, air gap and effective diameter in Table 3 may be mm. At least a portion of the front surface may face in a first direction (e.g., object-side direction (+Z direction)) facing the subject S, and at least a portion of the rear surface may face in a second direction (e.g., image-side direction (−Z direction)) facing the image sensor 404.

According to an embodiment, the camera module 400 may include at least one aspherical lens. For example, at least one of the first lens 410, the second lens 420, the third lens 430, the fourth lens 440, the fifth lens 450, the sixth lens 460, the seventh lens 470, or the eighth lens 480 may have at least one surface in an aspherical shape. According to an embodiment, at least one of the 5-1th surface 450a and the 5-2th surface 450b of the fifth lens 450 may be in an aspherical shape. According to an embodiment, the 8-1th surface 480a and the 8-2th surface 480b of the eighth lens 480 may be in an aspherical shape.

The shape of the aspherical lens may be obtained through Equation 1 above.

Table 4 below shows the respective aspheric coefficients of the first to eighth lenses 410, 420, 430, 440, 450, 460, 470, and 480. The first to eighth lenses 410, 420, 430, 440, 450, 460, 470, and 480 of the camera module 400 of the second embodiment (e.g., FIGS. 8 to 9C) may meet the conditions of Table 4 below.

TABLE 4

| | $K_{conic}$ | A | B | C | D | E | F | G |
|---|---|---|---|---|---|---|---|---|
| 410a | −0.7289 | −0.001393 | 0.023518 | −0.052704 | 0.0589176 | −0.009155 | −0.070314 | 0.1119462 |
| 410b | −43.68028 | −0.006728 | 0.0595571 | −0.291455 | 0.8446556 | −1.640282 | 2.2348199 | −2.186622 |
| 420a | 5.1599011 | −0.009996 | 0.0009892 | 0.0047202 | −0.00734 | 0.0091579 | −0.008956 | 0.0068302 |
| 420b | −15.89257 | −0.045476 | 0.1242044 | −0.188641 | 0.1805675 | −0.117167 | 0.0524891 | −0.016386 |
| 430a | 20.816539 | −0.038803 | 0.0249424 | 0.3961487 | −1.806706 | 4.2758753 | −6.500344 | 6.7118927 |
| 430b | 8.6992024 | −0.025939 | 0.104891 | −0.40776 | 1.2031557 | −2.42535 | 3.3452682 | −3.195556 |
| 440a | −0.615901 | −0.008811 | −0.031755 | 0.3473431 | −2.03692 | 7.5503787 | −18.66954 | 31.89665 |
| 440b | 131.51801 | −0.022675 | 0.0356869 | 0.0177483 | −0.713386 | 3.0946315 | −7.310359 | 11.131077 |
| 450a | 0 | −0.037446 | 0.0266521 | −0.12373 | 0.3244115 | −0.536857 | 0.5709353 | −0.391283 |
| 450b | 0 | −0.037921 | 0.0092038 | −0.00335 | −0.022225 | 0.0490019 | −0.054138 | 0.0367603 |
| 460a | 0.669887 | −0.04501 | 0.0181233 | −0.003091 | −0.003295 | 0.0022946 | −0.000709 | 0.0001161 |
| 460b | 0 | −0.052927 | 0.0174802 | −0.000195 | −0.003354 | 0.0018692 | −0.000582 | 0.0001221 |
| 470a | 0.5362663 | −0.018805 | −0.010619 | 0.0102828 | −0.00788 | 0.0042141 | −0.001587 | 0.0004252 |
| 470b | 42.217122 | 0.0075869 | −0.005476 | 0.0006293 | −4.14E−05 | 1.76E−05 | −6.71E−06 | 1.27E−06 |
| 480a | −630.482 | −0.102733 | 0.043441 | −0.013394 | 0.0031593 | −0.000566 | 7.70E−05 | −7.91E−06 |
| 480b | −14.88255 | −0.040967 | 0.011126 | −0.002136 | 0.0002601 | −1.99E−05 | 9.34E−07 | −2.52E−08 |

| | H | J | K | L | M | N | O |
|---|---|---|---|---|---|---|---|
| 410a | −0.093121 | 0.0495691 | −0.017704 | 0.0042339 | −0.000651 | 5.82E−05 | −2.29E−06 |
| 410b | 1.5534411 | −0.801664 | 0.2971896 | −0.077056 | 0.0132565 | −0.001359 | 6.28E−05 |
| 420a | −0.003864 | 0.0015153 | −0.000384 | 5.64E−05 | −3.68E−06 | 0 | 0 |
| 420b | 0.0035935 | −0.000555 | 6.01E−05 | −4.46E−06 | 2.16E−07 | −6.13E−09 | 7.78E−11 |
| 430a | −4.764078 | 2.2871736 | −0.701571 | 0.115679 | −0.002087 | −0.002464 | 0.0002883 |
| 430b | 2.1306132 | −0.989961 | 0.3160785 | −0.067167 | 0.0089216 | −0.000651 | 1.88E−05 |
| 440a | −38.44212 | 32.935805 | −19.94151 | 8.3378495 | −2.289612 | 0.3714017 | −0.026954 |
| 440b | −11.58014 | 8.4117206 | −4.266866 | 1.4813228 | −0.335296 | 0.0445538 | −0.002635 |
| 450a | 0.1625913 | −0.029837 | −0.006107 | 0.0051601 | −0.001343 | 0.0001683 | −8.52E−06 |
| 450b | −0.016163 | 0.0046293 | −0.00084 | 8.88E−05 | −4.21E−06 | −4.76E−08 | 9.01E−09 |
| 460a | −9.10E−06 | 2.50E−07 | 0 | 0 | 0 | 0 | 0 |
| 460b | −1.81E−05 | 1.88E−06 | −1.33E−07 | 6.12E−09 | −1.63E−10 | 1.91E−12 | 0 |
| 470a | −8.11E−05 | 1.10E−05 | −1.05E−06 | 6.87E−08 | −2.95E−09 | 7.50E−11 | −8.53E−13 |

TABLE 4-continued

| | | | | | | | |
|---|---|---|---|---|---|---|---|
| 470b | −1.34E−07 | 8.00E−09 | −2.52E−10 | 3.24E−12 | 0 | 0 | 0 |
| 480a | 6.10E−07 | −3.49E−08 | 1.45E−09 | −4.30E−11 | 8.54E−13 | −1.02E−14 | 5.59E−17 |
| 480b | 3.42E−10 | −1.61E−12 | 0 | 0 | 0 | 0 | 0 |

Figure 9A:
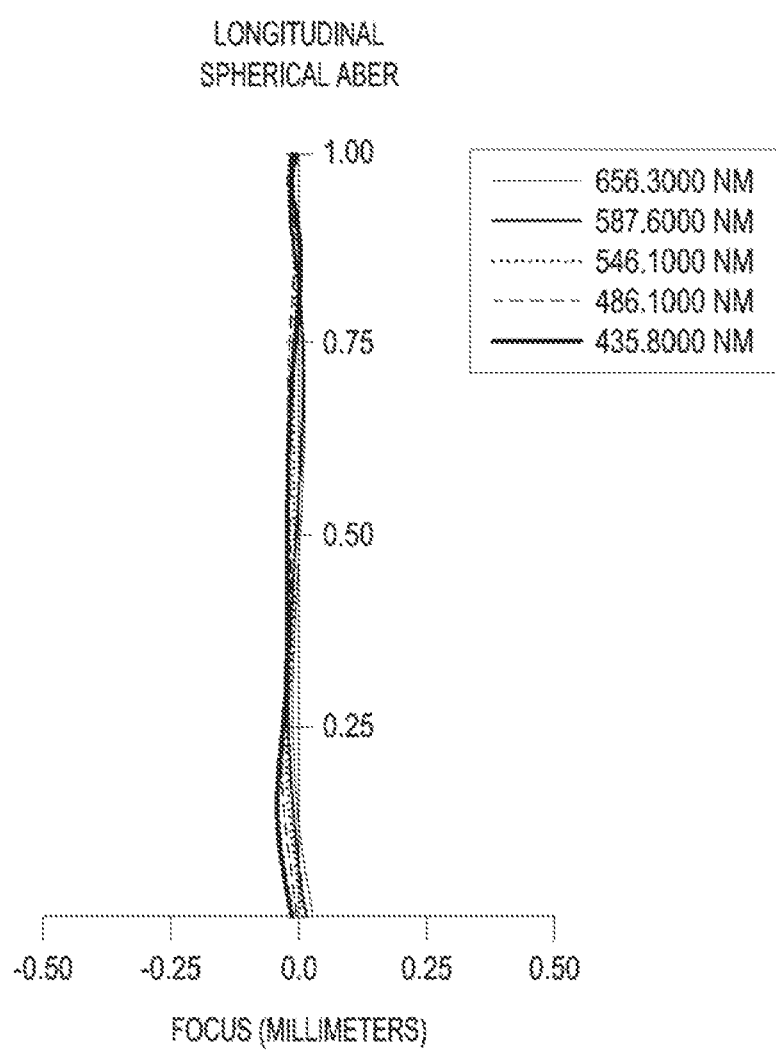
FIG. 9A is a graph illustrating spherical aberration of the camera module of FIG. 8.
Figure 9B:
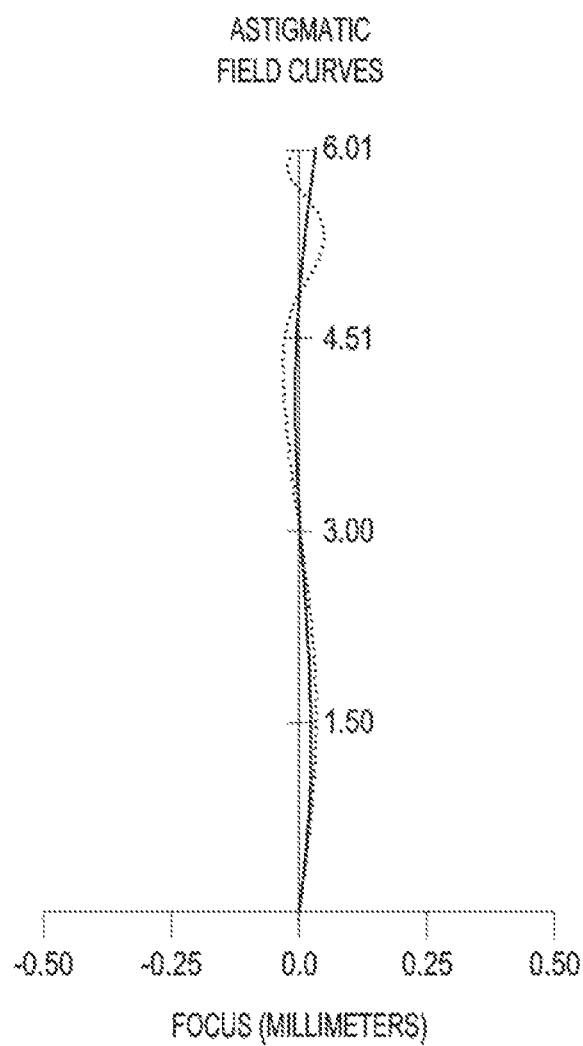
FIG. 9B is a graph illustrating astigmatism of the camera module of FIG. 8.
Figure 9C:
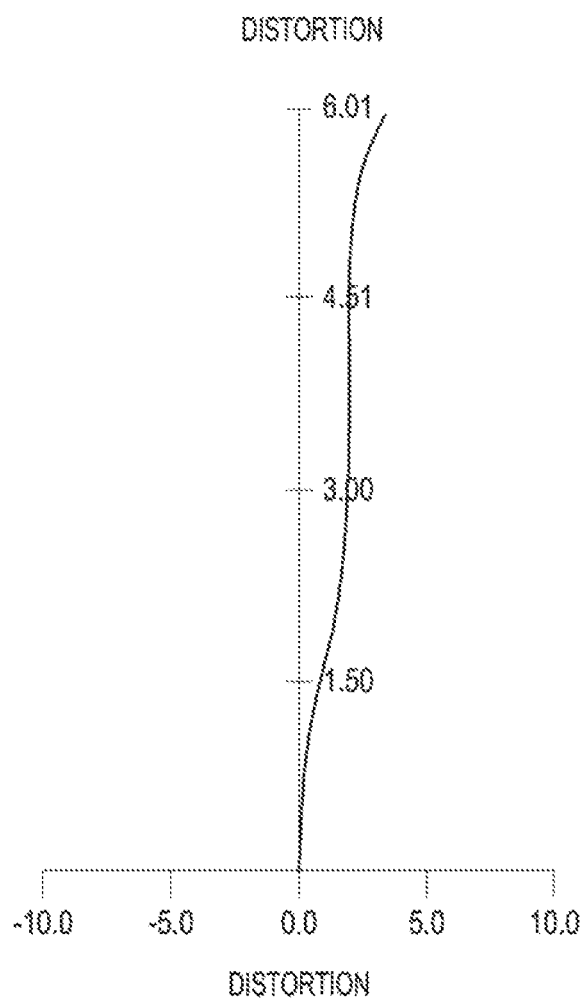
FIG. 9C is a graph illustrating a distortion rate of the camera module of FIG. 8.

FIG. 9A is a graph illustrating spherical aberration of the camera module 400 of FIG. 8. FIG. 9B is a graph illustrating astigmatism of the camera module 400 of FIG. 8. FIG. 9C is a graph illustrating a distortion rate of the camera module 400 of FIG. 8. No duplicate description is given below.

Referring to FIG. 9A, a change in longitudinal spherical aberration according to the wavelength of light is shown. The horizontal axis of FIG. 9A denotes the coefficient of longitudinal spherical aberration, and the vertical axis of FIG. 9A denotes the normalized distance from the center of the optical axis. According to an embodiment, in FIG. 9A, a change in longitudinal spherical aberration according to the wavelength of light is shown. The longitudinal spherical aberration is caused for light having, e.g., wavelengths of 656.3000 (nm, nanometer) (e.g., red), 587.6000 (nm) (e.g., yellow), 546.1000 (nm), 486.1000 (nm) (e.g., blue), and 435.8000 (nm).

In FIG. 9B, the astigmatic field curves of the camera module 400 are the results obtained at the wavelength of 546.1000 nm. The dotted line denotes the astigmatism (e.g., meridional curvature) in the tangential direction, and the solid line denotes astigmatism (e.g., sagittal curvature) in the sagittal direction. In FIG. 9B, the horizontal axis denotes the coefficient of astigmatism, and the vertical axis denotes the image height. For example, the image captured through the camera module 400 may have image blur, but such distortion merely amounts to a level that may be regularly seen in optical devices with lenses, and may provide good optical properties.

Referring to FIG. 9C, the distortion aberration is shown for the light having wavelength of 546.1000 nm. In the image captured through the camera module 400, distortion occurs at a point spaced apart from the optical axis (e.g., the optical axis O2 in FIG. 8), but the distortion of the camera module 400 may be less than 5%. For example, in the image captured through the camera module 400, pin cushion-type distortion occurs so that the measured image may be enlarged compared to the actual image that is not distorted. However, such distortion merely amounts to a degree that may be seen in a regular optical device using a lens, and the distortion ratio is less than about 2.5%. Thus, good optical properties may be provided.

FIG. 10 is a view schematically illustrating a camera module 500 according to yet another one of the various embodiments of the disclosure.

Referring to FIG. 10, the camera module 500 may include a plurality of lenses 510, 520, 530, 540, 550, 560, 570, and 580, an optical filter 502, and/or an image sensor 504. The configuration of the camera module 500 of FIG. 10 may be the same in whole or part as the configuration of the camera module 300 of FIG. 6, and no duplicate description is given below.

Table 5 below shows the radius of curvature, thickness or air gap, effective diameter, refractive index, and Abbe number of the first lens 510, the second lens 520, the third lens 530, the fourth lens 540, the fifth lens 550, the sixth lens 560, the seventh lens 570, and the eighth lens 580 of the camera module 500. The configuration of the first lens 510, the second lens 520, the third lens 530, the fourth lens 540, the fifth lens 550, the sixth lens 560, the seventh lens 570, the eighth lens 580, the optical filter 502, and the image sensor 504 according to the third embodiment (e.g., FIG. 10) may meet the conditions of Table 5.

According to an embodiment, the F-number, composite effective focal length (EFL) and/or field of view (FOV) of the camera module 500 may vary according to the design of the camera module. According to an embodiment (e.g., the third embodiment), the F-number of the camera module 500 may be 1.9, the composite effective focal length may be 6.5 mm, and the field of view may be 84 degrees.

TABLE 5

| | Radius of curvature | Thickness or air gap | Effective diameter | Refractive index | Abbe number |
|---|---|---|---|---|---|
| obj | Infinity | | | | |
| p | infinity | | | | |
| 510a | 2.268 | 0.928 | 5.407 | 1.5441 | 56.11 |
| 510b | 8.344 | 0.05 | | | |
| 520a | 7.929 | 0.254 | −10.973 | 1.82114 | 24.06 |
| 520b(ST) | 4.175 | 0.298 | | | |
| 530a | 15.461 | 0.35 | 27.437 | 1.56717 | 37.4 |
| 530b | infinity | 0.201 | | | |
| 540a | 20.257 | 0.292 | −81.753 | 1.67073 | 19.23 |
| 540b | 14.754 | 0.397 | | | |
| 550a | −5.83 | 0.25 | −109.056 | 1.5441 | 56.11 |
| 550b | −6.56 | 0.095 | | | |
| 560a | 11.666 | 0.25 | −61.222 | 1.56717 | 37.4 |
| 560b | 8.678 | 0.297 | | | |
| 570a | 2.255 | 0.38 | 8.99 | 1.5346 | 56.27 |
| 570b | 3.984 | 1.684 | | | |
| 580a | −13.409 | 0.321 | −5.323 | 1.5441 | 56.11 |
| 580b | 3.746 | 0.147 | | | |
| 502a | infinity | 0.11 | infinity | 1.5168 | 64.2 |
| 502b | infinity | 0.72 | | | |
| 504 | infinity | 0.002 | | | |

In Table 5 and/or Table 6 below, 'obj' may mean the subject S, 'p' the front surface of the camera module, '510a' and '510b' the front surface (1-1th surface) and rear surface (1-2th surface), respectively, of the first lens 510, '520a' and '520b' the front surface (2-1th surface) and rear surface (2-2th surface), respectively, of the second lens 520, '530a' and '530b' the front surface (3-1th surface) and rear surface (3-2th surface), respectively, of the third lens 530, '540a' and '540b' the front surface (4-1th surface) and rear surface (4-2th surface), respectively, of the fourth lens 540, '550a' and '550b' the front surface (5-1th surface) and rear surface (5-2th surface), respectively, of the fifth lens 550, '560a' and '560b' the front surface (6-1th surface) and rear surface (6-2th surface), respectively, of the sixth lens 560, '570a' and '570b' the front surface (7-1th surface) and rear surface (7-2th surface), respectively, of the seventh lens 570, '580a' and '580b' the front surface (8-1th surface) and rear surface (8-2th surface), respectively, of the eighth lens 580. '502a' and '502b' may mean the front and rear surfaces, respectively, of the optical filter 502. '504' may mean the image plane of the image sensor 504. The unit of the radius of curvature, thickness, air gap and effective diameter in Table 5 may be mm. At least a portion of the front surface may face in a first direction (e.g., object-side direction (+Z direction)) facing the subject S, and at least a portion of the rear surface may face in a second direction (e.g., image-side direction (−Z direction)) facing the image sensor 504.

According to various embodiments, the camera module 500 may include at least one aspherical lens. For example, at least one of the first lens 510, the second lens 520, the third lens 530, the fourth lens 540, the fifth lens 550, the sixth lens 560, the seventh lens 570, or the eighth lens 580 may have at least one surface in an aspherical shape. According to an embodiment, at least one of the 5-1th surface 550*a* and the 5-2th surface 550*b* of the fifth lens 550 may be in an aspherical shape. According to an embodiment, the 8-1th surface 580*a* and the 8-2th surface 580*b* of the eighth lens 580 may be in an aspherical shape.

The shape of the aspherical lens may be obtained through Equation 1 above.

Table 6 below shows the respective aspheric coefficients of the first to eighth lenses 510, 520, 530, 540, 550, 560, 570, and 580. The first to eighth lenses 510, 520, 530, 540, 550, 560, 570, and 580 of the camera module 500 of the third embodiment (e.g., FIGS. 10 to 11C) may meet the conditions of Table 6 below.

the wavelength of light is shown. The longitudinal spherical aberration is caused for light having, e.g., wavelengths of 656.3000 (nm, nanometer) (e.g., red), 587.6000 (nm) (e.g., yellow), 546.1000 (nm), 486.1000 (nm) (e.g., blue), and 435.8000 (nm).

Figure 11A:
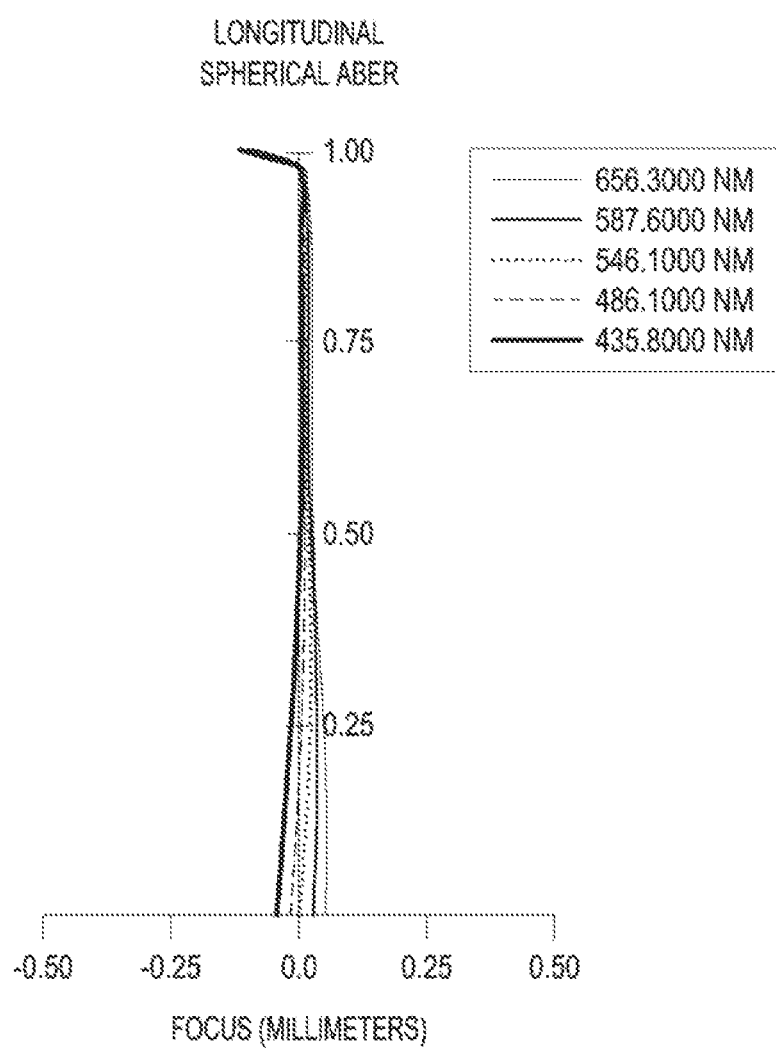
FIG. 11A is a graph illustrating spherical aberration of the camera module of FIG. 10.
Figure 11B:
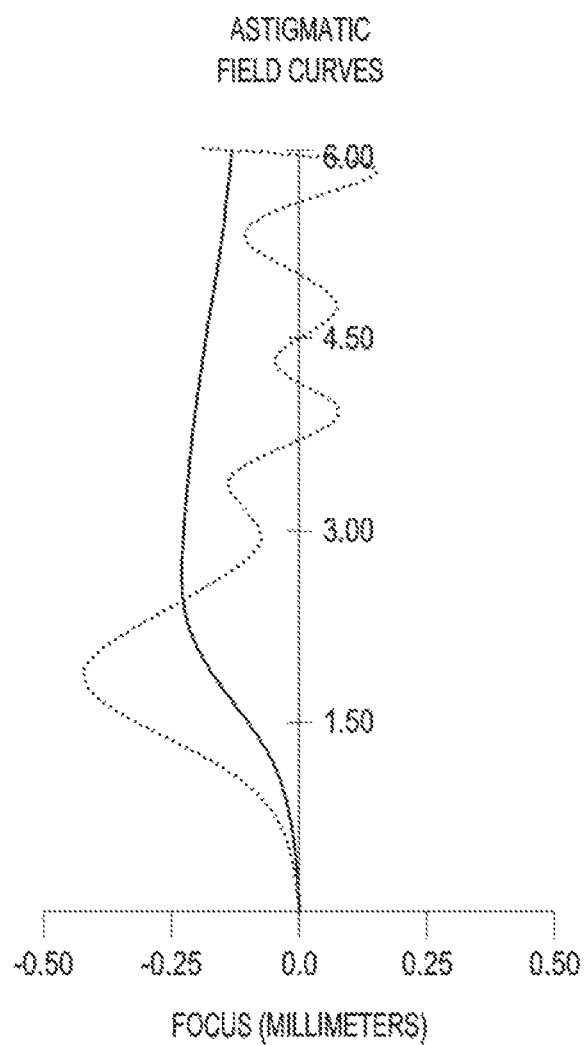
FIG. 11B is a graph illustrating astigmatism of the camera module of FIG. 10.

In FIG. 11B, the astigmatic field curves of the camera module 400 are the results obtained at the wavelength of 546.1000 nm. The dotted line denotes the astigmatism (e.g., meridional curvature) in the tangential direction, and the solid line denotes astigmatism (e.g., sagittal curvature) in the sagittal direction. In FIG. 11B, the horizontal axis denotes the coefficient of astigmatism, and the vertical axis denotes the image height. For example, the image captured through the camera module 500 may have image blur, but such distortion merely amounts to a level that may be regularly seen in optical devices with lenses, and may provide good optical properties.

Figure 11C:
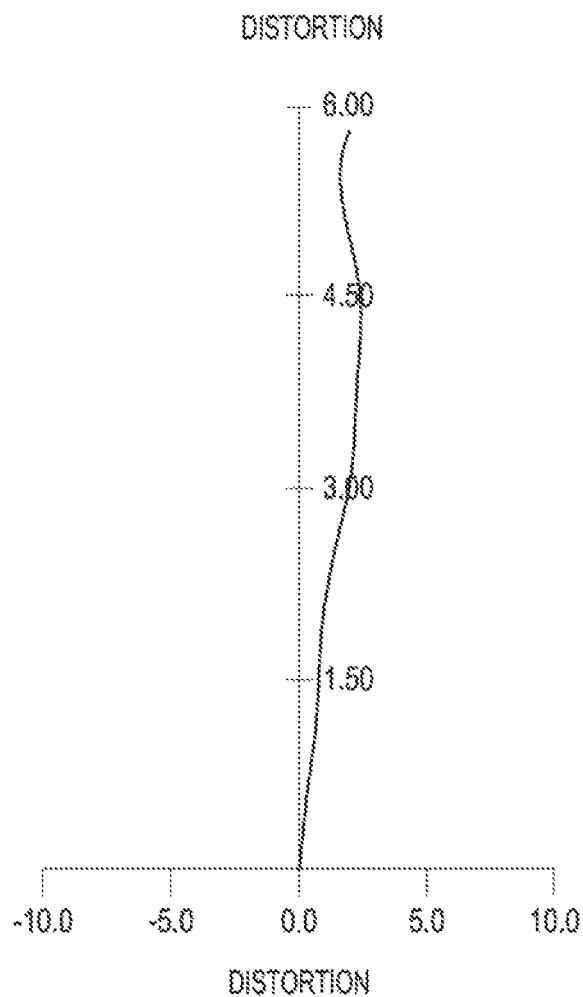
FIG. 11C is a graph illustrating a distortion rate of the camera module of FIG. 10.

Referring to FIG. 11C, the distortion aberration is shown for the light having wavelength of 546.1000 nm. In the image captured through the camera module 500, distortion occurs at a point spaced apart from the optical axis (e.g., the

TABLE 6

| | $K_{conic}$ | A | B | C | D | E | F | G |
|---|---|---|---|---|---|---|---|---|
| 510a | 0.8701 | 0.031966 | 0.12319 | 0.391939 | 0.74216 | 0.829811 | 0.42954 | 0.17377 |
| 510b | 14.75344 | 0.036118 | 0.87764 | 4.787971 | 15.421 | 33.30439 | 50.5279 | 55.11046 |
| 520a | 17.95911 | 0.02584 | 0.42451 | 2.856145 | 9.9404 | 22.66485 | 36.0239 | 41.00695 |
| 520b | 5.112666 | 0.035955 | 0.79139 | 5.509717 | 22.7498 | 62.87357 | 121.672 | 168.7488 |
| 530a | 118.1601 | 0.020367 | 0.6657 | 5.540641 | 27.0857 | 86.12869 | 187.598 | 288.6834 |
| 530b | −1 | −0.1702 | 1.272684 | 6.90052 | 25.07508 | 64.4324 | 121.196 | 169.486 |
| 540a | 85.7242 | 0.03327 | 0.31774 | 1.478775 | 3.60514 | 4.010957 | 1.656709 | 12.4462 |
| 540b | 82.7094 | 0.07128 | 1.19671 | 6.393022 | 21.5306 | 48.58246 | 76.3317 | 85.46103 |
| 550a | 8.297711 | 0.017763 | 0.09914 | 0.84243 | 2.946369 | 6.11219 | 8.257211 | 7.59142 |
| 550b | 7.656909 | 0.03565 | 0.318723 | 1.51747 | 4.347978 | 8.10615 | 10.2893 | 9.16609 |
| %60a | 13.96907 | 0.06429 | 0.03913 | 0.05886 | 0.117811 | 0.16291 | 0.142912 | 0.0827 |
| 560b | 20.0388 | 0.07779 | 0.04756 | 0.142908 | 0.14486 | 0.085161 | 0.03154 | 0.007445 |
| 570a | −7.84512 | 0.064948 | −0.11618 | 0.093675 | −0.05285 | 0.021276 | −0.00621 | 0.00133 |
| 570b | −18.5276 | 0.08795 | 0.0865 | 0.040984 | −0.00831 | 0.0025 | 0.002486 | −0.00092 |
| 580a | 4.0149 | −0.13087 | 0.080962 | −0.03832 | 0.01426 | −0.00387 | 0.000754 | −0.00011 |
| 580b | 27.435 | −0.08443 | 0.045965 | −0.01896 | 0.005745 | −0.00125 | 0.000193 | −2.16E−05 |

| | H | J | K | L | M | N | O |
|---|---|---|---|---|---|---|---|
| 510a | 0.498836 | 0.43395 | 0.221724 | 0.0724 | 0.014912 | 0.00177 | 9.28E−05 |
| 510b | 43.6678 | 25.13803 | 10.3948 | 3.005774 | 0.57656 | 0.065874 | 0.00339 |
| 520a | 33.8401 | 20.26555 | 8.71341 | 2.61972 | 0.52262 | 0.062128 | 0.00333 |
| 520b | 169.583 | 123.5547 | 64.5601 | 23.56322 | 5.70073 | 0.821123 | 0.05329 |
| 530a | 319.069 | 254.3487 | 144.988 | 57.64154 | 15.1794 | 2.379366 | 0.16804 |
| 530b | 176.5983 | 136.024 | 76.07995 | 29.9376 | 7.836936 | 1.22288 | 0.085944 |
| 540a | 20.03751 | 18.379 | 10.79664 | 4.12038 | 0.983202 | 0.13178 | 0.007407 |
| 540b | 68.9589 | 40.12653 | 16.6506 | 4.795397 | 0.90872 | 0.101625 | 0.00507 |
| 550a | 4.84668 | 2.15467 | 0.657017 | 0.13212 | 0.016134 | 0.00099 | 1.66E−05 |
| 550b | 5.831202 | 2.66283 | 0.86604 | 0.19576 | 0.029219 | 0.00259 | 0.00013 |
| %60a | 0.032735 | 0.00903 | 0.001735 | 0.00023 | 1.95E−05 | 9.75E−07 | 2.17E−08 |
| 560b | 0.00105 | 5.45E−05 | 8.84E−06 | 2.14E−06 | 2.06E−07 | 1.01E−08 | 2.08E−10 |
| 570a | −0.00021 | 2.41E−05 | −1.99E−06 | 1.15E−07 | −4.41E−09 | 1.01E−10 | −1.03E−12 |
| 570b | 0.000211 | −3.22E−05 | 3.39E−06 | −2.43E−07 | 1.13E−08 | −3.11E−10 | 3.80E−12 |
| 580a | 1.06E−05 | −7.61E−07 | 3.85E−08 | −1.32E−09 | 2.85E−11 | −3.37E−13 | 1.50E−15 |
| 580b | 1.75E−06 | −1.02E−07 | 4.28E−09 | −1.23E−10 | 2.33E−12 | −2.60E−14 | 1.31E−16 |

FIG. 11A is a graph illustrating spherical aberration of the camera module of FIG. 10. FIG. 11B is a graph illustrating astigmatism of the camera module of FIG. 10. FIG. 11C is a graph illustrating a distortion rate of the camera module of FIG. 10.

Referring to FIG. 11A, a change in longitudinal spherical aberration according to the wavelength of light is shown. The horizontal axis of FIG. 11A denotes the coefficient of longitudinal spherical aberration, and the vertical axis of FIG. 11A denotes the normalized distance from the center of the optical axis. According to an embodiment, in FIG. 11A, a change in longitudinal spherical aberration according to optical axis O3 in FIG. 10), but the distortion of the camera module 500 may be less than 5%. For example, in the image captured through the camera module 400, pin cushion-type distortion occurs so that the measured image may be enlarged compared to the actual image that is not distorted. However, such distortion merely amounts to a degree that may be seen in a regular optical device using a lens, and the distortion ratio is less than about 2.5%. Thus, good optical properties may be provided.

According to certain embodiments of the disclosure, the configurations of the camera modules 300, 400, and 500 may meet at least one of conditional equations 1 to 8 above. For example, data of the camera modules 300, 400, and 500 may meet Table 7 below.

TABLE 7

|  | First embodiment | Second embodiment | Third embodiment |
|---|---|---|---|
| Equation 1 | 1.18 | 1.04 | 1.2 |
| Equation 2 | 0.58 | 0.59 | 0.59 |
| Equation 3 | 56.1 | 56.1 | 56.1 |
| Equation 4 | 41 | 40 | 41 |
| Equation 5 | −19 | −19.6 | −18.4 |
| Equation 6 | 18.4 | 18.4 | 19.2 |
| Equation 7 | 1.9 | 1.8 | 1.9 |
| Equation 8 | 27 | 29 | 27 |

In Table 7 above, the 'first embodiment' may mean the camera module 300 shown in FIG. 6, the 'second embodiment' the camera module 400 shown in FIG. 8, the 'third embodiment' the camera module 500 shown in FIG. 10, 'Equation 1' containing the quantity $$\frac{f}{f1},$$

'Equation 2' containing the quantity $$\frac{TTL}{IH*2},$$

'Equation 3' containing the quantity L8 Vd, 'Equation 4' containing the quantity Cra max, 'Equation 5' containing the quantity efy s4 . . . s7, 'Equation 6' containing the quantity vd min, 'Equation 7' containing the quantity $$\frac{efl}{epd},$$

and 'Equation 8' containing the quantity L8 S1 sag max sag angle. As described above, according to certain embodiments of the disclosure, the camera modules 300, 400, and 500 may include eight lenses for obtaining high-quality images (e.g., high-resolution bright images) and may be miniaturized.

According to certain embodiments, the camera modules 300, 400, and 500 may be equipped in mobile devices, such as mobile phones, smart phones, or digital cameras. Further, according to certain embodiments, the camera modules 300, 400, and 500 may be applied to, e.g., tablet computing devices, laptop computers, netbook, subnotebook, or ultrabook computers, surveillance cameras, automobile cameras, augmented reality (AR) glasses, virtual reality (VR) glasses, action cams, or the like. It may also be possible to implement dual or multi camera structures along with, e.g., a wide-angle lens camera or one or more other camera modules so as to obtain zoom images having a higher magnification.

In the camera module 300 according to certain embodiments (e.g., FIG. 6, 8, or 10) of the disclosure, the thickness of the lens, the size of the lens, or the shape of the lens are slightly exaggerated for the detailed description of the disclosure. In particular, the shape of the spherical or aspherical surface of the lens illustrated in FIG. 6, 8, or 10 is provided as examples and are not limited thereto.

According to an embodiment of the disclosure, a camera module (e.g., the camera module 300 of FIG. 6) may comprise a first lens (e.g., the first lens 310 of FIG. 6), a second lens (e.g., the second lens 320 of FIG. 6), a third lens (e.g., the third lens 330 of FIG. 6), a fourth lens (e.g., the fourth lens 340 of FIG. 6), a fifth lens (e.g., the fifth lens 350 of FIG. 6), a sixth lens (e.g., the sixth lens 360 of FIG. 6), a seventh lens (e.g., the seventh lens 370 of FIG. 6), and an eighth lens (e.g., the eighth lens 380 of FIG. 6) arranged in order from a subject (e.g., the subject S of FIG. 6). The first lens may have positive (+) refractive power and include a 1-1th surface (e.g., the 1-1th surface 310*a* of FIG. 6) convex toward the subject. The seventh lens may include a 7-1th surface (e.g., the 7-1th surface 370*a* of FIG. 6) facing the subject and including at least one inflection point. The eighth lens may have negative (−) refractive power, include an 8-1th surface (e.g., the 8-1th surface 380*a* of FIG. 6) facing the subject and formed as an aspherical surface, and include an 8-2th surface (e.g., the 8-2th surface 380*b* of FIG. 6) opposite to the 8-1th surface, the 8-2th surface including at least one inflection point and is formed as an aspherical surface. The camera module may be configured to meet conditional equation 1, conditional equation 2, and conditional equation 3 below.

$$1 < \frac{f}{f1} < 2 \quad \text{[Conditional equation 1]}$$

(f denotes a composite focal length of the camera module, and f1 denotes a focal length of the first lens).

$$0.4 < \frac{TTL}{IH*2} < 0.62 \quad \text{[Conditional equation 2]}$$

(TTL denotes a distance from an outermost surface of the camera module to an image plane, and IH denotes an image height at an effective diameter). [Conditional equation 3] 50<L8 Vd<70 (L8 Vd denotes an Abbe number of the eighth lens).

According to an embodiment, the camera module may be configured to meet conditional equation 4 below. [Conditional equation 4] 30°<Cra max<50° (Cra max denotes a maximum angle of a chief ray incident on an image sensor of the camera module).

According to an embodiment, the camera module may be configured to meet conditional equation 5 below. [Conditional equation 5] −50 mm<efy s4 . . . s7<0 mm (efy s4 . . . s7 denotes a composite focal length of the second lens and the third lens).

According to an embodiment, the fifth lens may have a negative (−) refractive power. The fifth lens may include a concave 5-1th surface (e.g., the 5-1th surface 350*a* of FIG. 6) facing the subject and a convex 5-2th surface (e.g., the 5-2th surface 350*b* of FIG. 6) opposite to the 5-1th surface.

According to an embodiment, the camera module may be configured to meet conditional equation 6 below. [Conditional equation 6] 17<vd min<25 (vd min denotes a minimum value of an Abbe number of the first lens, an Abbe number of the second lens, an Abbe number of the third lens, an Abbe number of the fourth lens, an Abbe number of the fifth lens, an Abbe number of the sixth lens, an Abbe number of the seventh lens, and an Abbe number of the eighth lens).

According to an embodiment, the camera module may be configured to meet conditional equation 7 below.

$$1.5 < \frac{efl}{epd} < 2.0 \qquad \text{[Conditional equation 7]}$$

(efl denotes an effective focal length of the camera module, and epd denotes an entrance pupil diameter of the camera module).

According to an embodiment, the camera module may be configured to meet conditional equation 8 below. [Conditional equation 8] L8 S1 sag max sag angle<40° (L8 S1 sag max sag angle denotes a sag angle at a point where the 8-1th surface has a maximum sag value).

According to an embodiment, the camera module may further comprise a stop disposed between the second lens and the third lens.

According to an embodiment, the second lens may include a 2-1th surface (e.g., the 2-1th surface 320a of FIG. 6) facing the first lens and a 2-2th surface (e.g., the 2-2th surface 320b of FIG. 6) opposite to the 2-1th surface. The stop may be disposed on the 2-2th surface.

According to an embodiment, the third lens may include a 3-1th surface (e.g., the 3-1th surface 330a of FIG. 6) facing the second lens and a 3-2th surface (e.g., the 3-2th surface 330b of FIG. 6) opposite to the 3-1th surface. The stop may be disposed on the 3-1th surface.

According to an embodiment, the 7-1th surface may be convex.

According to an embodiment, at least one of the first lens, the second lens, the third lens, the fourth lens, the fifth lens, the sixth lens, or the seventh lens may have at least one aspherical surface.

According to an embodiment, the camera module may further comprise an optical filter (e.g., the optical filter 302 of FIG. 6) including at least one of a low pass filter, an infrared filter, or cover glass.

According to an embodiment, the camera module may further comprise an image sensor (e.g., the image sensor 304 of FIG. 6) at least partially facing the eighth lens.

According to an embodiment of the disclosure, an electronic device (e.g., the electronic device 200 of FIG. 2) may comprise a housing (e.g., the housing 210 of FIG. 2) and a camera module (e.g., the camera module 300 of FIG. 6) at least partially disposed in the housing. The camera module may comprise a first lens (e.g., the first lens 310 of FIG. 6), a second lens (e.g., the second lens 320 of FIG. 6), a third lens (e.g., the third lens 330 of FIG. 6), a fourth lens (e.g., the fourth lens 340 of FIG. 6), a fifth lens (e.g., the fifth lens 350 of FIG. 6), a sixth lens (e.g., the sixth lens 360 of FIG. 6), a seventh lens (e.g., the seventh lens 370 of FIG. 6), and an eighth lens (e.g., the eighth lens 380 of FIG. 6) arranged in order from a subject (e.g., the subject S of FIG. 6). The first lens may have positive (+) refractive power and include a 1-1th surface (e.g., the 1-1th surface 310a of FIG. 6) convex toward the subject. The seventh lens may include a 7-1th surface (e.g., the 7-1th surface 370a of FIG. 6) facing the subject and including at least one inflection point. The eighth lens may have negative (−) refractive power, include an 8-1th surface (e.g., the 8-1th surface 380a of FIG. 6) facing the subject and formed as an aspherical surface, and including an 8-2th surface (e.g., the 8-2th surface 380b of FIG. 6) opposite to the 8-1th surface, the 8-2th surface including at least one inflection point and is formed as an aspherical surface. The camera module may be configured to meet conditional equation 1, conditional equation 2, and conditional equation 3 below.

$$1 < \frac{f}{f1} < 2 \qquad \text{[Conditional equation 1]}$$

(f denotes a composite focal length of the camera module, and f1 denotes a focal length of the first lens).

$$0.4 < \frac{TTL}{IH*2} < 0.62 \qquad \text{[Conditional equation 2]}$$

(TTL denotes a distance from an outermost surface of the camera module to an image plane, and IH denotes an image height at an effective diameter). [Conditional equation 3] 50<L8 Vd<70 (L8 Vd denotes an Abbe number of the eighth lens).

It is apparent to one of ordinary skill in the art that a camera module and an electronic device including the camera module as described above are not limited to the above-described embodiments and those shown in the drawings, and various changes, modifications, or alterations may be made thereto without departing from the scope of the disclosure.

What is claimed is:

1. A camera module comprising:
    a first lens; a second lens; a third lens; a fourth lens; a fifth lens; a sixth lens; a seventh lens; and an eighth lens arranged in order from a subject,
    wherein the first lens includes a 1-1th surface, has positive (+) refractive power, and is convex toward the subject,
    wherein the seventh lens includes a 7-1th surface facing the subject and including at least one inflection point,
    wherein the eighth lens has negative (−) refractive power, includes an 8-1th surface facing the subject and formed as an aspherical surface, and includes an 8-2th surface opposite to the 8-1th surface, the 8-2th surface including at least one inflection point and is formed as an aspherical surface,
    wherein the camera module is configured to meet conditional equation 1, conditional equation 2, and conditional equation 3, $$1 < \frac{f}{f1} < 2 \qquad \text{[conditional equation 1]}$$

wherein f denotes a composite focal length of the camera module, and f1 denotes a focal length of the first lens, $$0.4 < \frac{TTL}{IH*2} < 0.62 \qquad \text{[conditional equation 2]}$$

wherein TTL denotes a distance from an outermost surface of the camera module to an image plane, and IH denotes an image height at an effective diameter, and
    [conditional equation 3]
    50<L8 Vd<70
    wherein L8 Vd denotes an Abbe number of the eighth lens.

2. The camera module of claim 1, wherein the camera module is configured to meet conditional equation 4,
    [conditional equation 4]
    30°<Cra max <50°
    wherein Cra max denotes a maximum angle of a chief ray incident on an image sensor of the camera module.

3. The camera module of claim 1, wherein the camera module is configured to meet conditional equation 5,

[conditional equation 5]

−50 mm<efy s4 s7<0 mm wherein efy s4 s7 denotes a composite focal length of the second lens and the third lens.

4. The camera module of claim 1, wherein the fifth lens has negative (−) refractive power, and wherein the fifth lens includes a concave 5-1th surface facing the subject and a convex 5-2th surface opposite to the 5-1th surface.

5. The camera module of claim 1, wherein the camera module is configured to meet conditional equation 6,

[conditional equation 6]

17<vd min <20 wherein vd min denotes a minimum value of an Abbe number of the first lens, an Abbe number of the second lens, an Abbe number of the third lens, an Abbe number of the fourth lens, an Abbe number of the fifth lens, an Abbe number of the sixth lens, an Abbe number of the seventh lens, and an Abbe number of the eighth lens.

6. The camera module of claim 1, wherein the camera module is configured to meet conditional equation 7, $$1.5 < \frac{efl}{epd} < 2.0$$ [conditional equation 7]

wherein efl denotes an effective focal length of the camera module, and epd denotes an entrance pupil diameter of the camera module.

7. The camera module of claim 1, wherein the camera module is configured to meet conditional equation 8,

[conditional equation 8]

L8 S1 sag max sag angle <40° wherein L8 S1 sag max sag angle denotes a sag angle at a point where the 8-1th surface has a maximum sag value.

8. The camera module of claim 1, further comprising a stop disposed between the second lens and the third lens.

9. The camera module of claim 8, wherein the second lens includes a 2-1th surface facing the first lens and a 2-2th surface opposite to the 2-1th surface, and wherein the stop is disposed on the 2-2th surface.

10. The camera module of claim 8, wherein the third lens includes a 3-1th surface facing the second lens and a 3-2th surface opposite to the 3-1th surface, and wherein the stop is disposed on the 3-1th surface.

11. The camera module of claim 1, wherein the 7-1th surface is convex.

12. The camera module of claim 1, wherein the first lens, the second lens, the third lens, the fourth lens, the fifth lens, the sixth lens, and/or the seventh lens has at least one aspherical surface.

13. The camera module of claim 1, further comprising an optical filter including a low pass filter, an infrared filter, and/or cover glass.

14. The camera module of claim 1, further comprising an image sensor at least partially facing the eighth lens.

15. An electronic device comprising:

a housing; and a camera module at least partially disposed in the housing, wherein the camera module includes, a first lens; a second lens; a third lens; a fourth lens; a fifth lens; a sixth lens; a seventh lens; and an eighth lens arranged in order from a subject, wherein the first lens includes a 1-1th surface, has positive (+) refractive power, and is convex toward the subject, wherein the seventh lens includes a 7-1th surface facing the subject and including at least one inflection point, wherein the eighth lens has negative (−) refractive power, includes an 8-1th surface facing the subject and formed as an aspherical surface, and includes an 8-2th surface opposite to the 8-1th surface, the 8-2th surface including at least one inflection point and is formed as an aspherical surface, wherein the camera module is configured to meet conditional equation 1, conditional equation 2, and conditional equation 3, $$1 < \frac{f}{f1} < 2$$ [conditional equation 1]

wherein f denotes a composite focal length of the camera module, and f1 denotes a focal length of the first lens, $$0.4 < \frac{TTL}{IH*2} < 0.62$$ [conditional equation 2]

wherein TTL denotes a distance from an outermost surface of the camera module to an image plane, and IH denotes an image height at an effective diameter, and

[conditional equation 3]

50<L8 Vd<70 wherein L8 Vd denotes an Abbe number of the eighth lens.

16. The electronic device of claim 15, wherein the camera module is configured to meet conditional equation 4,

[conditional equation 4]

30°<Cra max <50° wherein Cra max denotes an angle of a chief ray incident on an image sensor of the camera module.

17. The electronic device of claim 15, wherein the camera module is configured to meet conditional equation 5,

[conditional equation 5]

−50 mm<efy s4 s7<0 mm wherein efy s4 s7 denotes a composite focal length of the second lens and the third lens.

18. The electronic device of claim 15, wherein the camera module is configured to meet conditional equation 6,

[conditional equation 6]

17<vd min <20 wherein vd min denotes a minimum value of an Abbe number of the first lens, an Abbe number of the second lens, an Abbe number of the third lens, an Abbe number of the fourth lens, an Abbe number of the fifth lens, an Abbe number of the sixth lens, an Abbe number of the seventh lens, and an Abbe number of the eighth lens.

19. The electronic device of claim 15, wherein the camera module is configured to meet conditional equation 7, $$1.5 < \frac{efl}{epd} < 2.0$$ [conditional equation 7]

wherein efl denotes an effective focal length of the camera module, and epd denotes an entrance pupil diameter of the camera module.

20. The electronic device of claim 15, wherein the camera module is configured to meet conditional equation 8,

[conditional equation 8]

L8 S1 sag max sag angle <40° wherein L8 S1 sag max sag angle denotes a sag angle at a point where the 8-1th surface has a maximum sag value.

* * * * *

UNITED STATES PATENT AND TRADEMARK OFFICE
CERTIFICATE OF CORRECTION

PATENT NO. : 12,069,358 B2
APPLICATION NO. : 17/744849
DATED : August 20, 2024
INVENTOR(S) : Jinseon Seo et al.

Page 1 of 1

It is certified that error appears in the above-identified patent and that said Letters Patent is hereby corrected as shown below:

On the Title Page

Item (63) should read:
PCT/KR2022/001783, filed on Feb. 4, 2022.

Signed and Sealed this
Eleventh Day of March, 2025

Coke Morgan Stewart
*Acting Director of the United States Patent and Trademark Office*